(12) United States Patent
Sato et al.

(10) Patent No.: US 6,779,933 B2
(45) Date of Patent: Aug. 24, 2004

(54) LIGHT-QUANTITY ADJUSTING APPARATUS AND OPTICAL APPARATUS

(75) Inventors: Tatsuya Sato, Tochigi (JP); Toshiaki Kawanishi, Kanagawa (JP); Shigeo Nakashima, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/422,484

(22) Filed: Apr. 24, 2003

(65) Prior Publication Data

US 2003/0202791 A1 Oct. 30, 2003

(30) Foreign Application Priority Data

Apr. 30, 2002 (JP) ........................ 2002-127782
May 1, 2002 (JP) ........................ 2002-129536
Jul. 3, 2002 (JP) ........................ 2002-195055

(51) Int. Cl.[7] .............................................. G03B 9/26
(52) U.S. Cl. ...................................... 396/463; 396/494
(58) Field of Search ................................ 348/362–366; 396/463, 493, 494

(56) References Cited

U.S. PATENT DOCUMENTS 6,340,252 B1 * 1/2002 Kawano ..................... 396/450

2002/0127013 A1    9/2002  Mizumaki et al. .......... 396/463

FOREIGN PATENT DOCUMENTS

JP    2000/310803    11/2000

* cited by examiner

Primary Examiner—David M. Gray
(74) Attorney, Agent, or Firm—Morgan & Finnegan LLP

(57) ABSTRACT

A light-quantity adjusting apparatus is disclosed, in which a light-blocking member and an optical filter can be driven with a single actuator, and which can be made compact. The light-quantity adjusting apparatus includes a light-blocking member that changes a quantity of light through an open/close operation within an optical path, an optical filter that can be inserted into and withdrawn from the optical path, independently from the light-blocking member, and a driving mechanism that has a single actuator as a driving source and that drives the light-blocking member and the optical filter. The driving mechanism drives the optical filter by operating the actuator further in an opening direction after the actuator has driven the light-blocking member into an open position, and operating the actuator further in a closing direction after the actuator has driven the light-blocking member into a closed position.

13 Claims, 20 Drawing Sheets

LIGHT-QUANTITY ADJUSTING APPARATUS AND OPTICAL APPARATUS

BACKGROUND OF THE INVENTION

1. Field of the Invention

The present invention relates to light-quantity adjusting apparatuses used in optical apparatuses, such as cameras, video cameras, digital cameras or lens apparatuses mounted to them.

2. Description of the Related Art

Electronic cameras, such as video cameras or digital cameras equipped with a solid-state image pickup device, and film cameras using photographic film are provided with a light-quantity adjusting apparatus controlling the size of the aperture in order to adjust the focal depth of the lens and to adjust the light quantity of the field that is to be imaged onto the film or the solid-state image pickup device.

Currently, most light-quantity adjusting apparatuses use a plurality of diaphragm blades as a light-blocking member. Known types include a type in which the aperture diameter is changed continuously with the optical axis in the center, like in an iris, and a type in which the aperture diameter is changed by moving two diaphragm blades substantially parallel in opposite directions.

The former type has the advantage that it is possible to attain any aperture diameter because the aperture diameter is changed continuously. However, a large number of diaphragm blades has to be provided in order to attain an aperture of nearly circular shape, so that there is the disadvantage of higher costs.

On the other hand, the latter type has the advantage of lower costs, because the number of diaphragm blades is small, but the aperture shape changes depending on the aperture area, so that there is the drawback that it is difficult to attain a uniform nearly circular shape.

Furthermore, a technology of combining such a light-quantity adjusting apparatus with an optical filter called an ND filter (light reduction filter) is known, with which the light amount of the imaged field can be controlled over more stages than with diaphragm blades alone.

Furthermore, besides the light-quantity adjusting apparatus, also the shutter device serves as an exposure control mechanism of the camera. Shutter devices can be broadly classified into focal-plane shutters and lens shutters. If the light-quantity adjusting apparatus is provided in a camera equipped with a lens shutter, then the light-quantity adjusting apparatus is arranged adjacent to the lens shutter, so that it is desirable that these apparatuses are provided in a compact manner and fabricated at low cost.

In particular recently, such demands have increased considerably, because the shutter blades have come to be opened and closed by an actuator.

However, in conventional light-quantity adjusting apparatuses proposed in Japanese Patent Laid-Open No. 2000-310803, an actuator 413 for driving the diaphragm blades 404 and an actuator 414 for driving the ND filter 409 are provided separately, as shown in FIG. 20.

Furthermore, if also the shutter blades are driven by an actuator, then a total of three actuators are needed, so that the structural portion related to the light-quantity adjustment becomes large and the camera or lens barrel to which this structural portion is mounted becomes bulky, in addition to higher costs.

SUMMARY OF THE INVENTION

It is thus an object of the present invention to provide a light-quantity adjusting apparatus in which a single actuator serves both as an actuator driving a light-blocking member, which are diaphragm blades or diaphragm blades also serving as shutter blades, and as an actuator driving an optical filter, and which can be made more compact and less expensive.

In order to attain this object, a light-quantity adjusting apparatus includes a light-blocking member that changes a quantity of light through an open/close operation within an optical path, an optical filter that can be inserted into and withdrawn from the optical path, independently from the light-blocking member, and a driving mechanism that has a single actuator as a driving source and that drives the light-blocking member and the optical filter. The driving mechanism drives the optical filter by at least one operation selected from operating the actuator further in an opening direction after the actuator has driven the light-blocking member into an open position, and operating the actuator further in a closing direction after the actuator has driven the light-blocking member into a closed position.

These and further objects and features of the invention will become apparent from the following detailed description of preferred embodiments thereof taken in conjunction with the accompanying drawings.

DESCRIPTION OF THE PREFERRED EMBODIMENTS

Embodiment 1

The following is an explanation of preferable embodiments of the present invention, with reference to the accompanying drawings.

Figure 1:
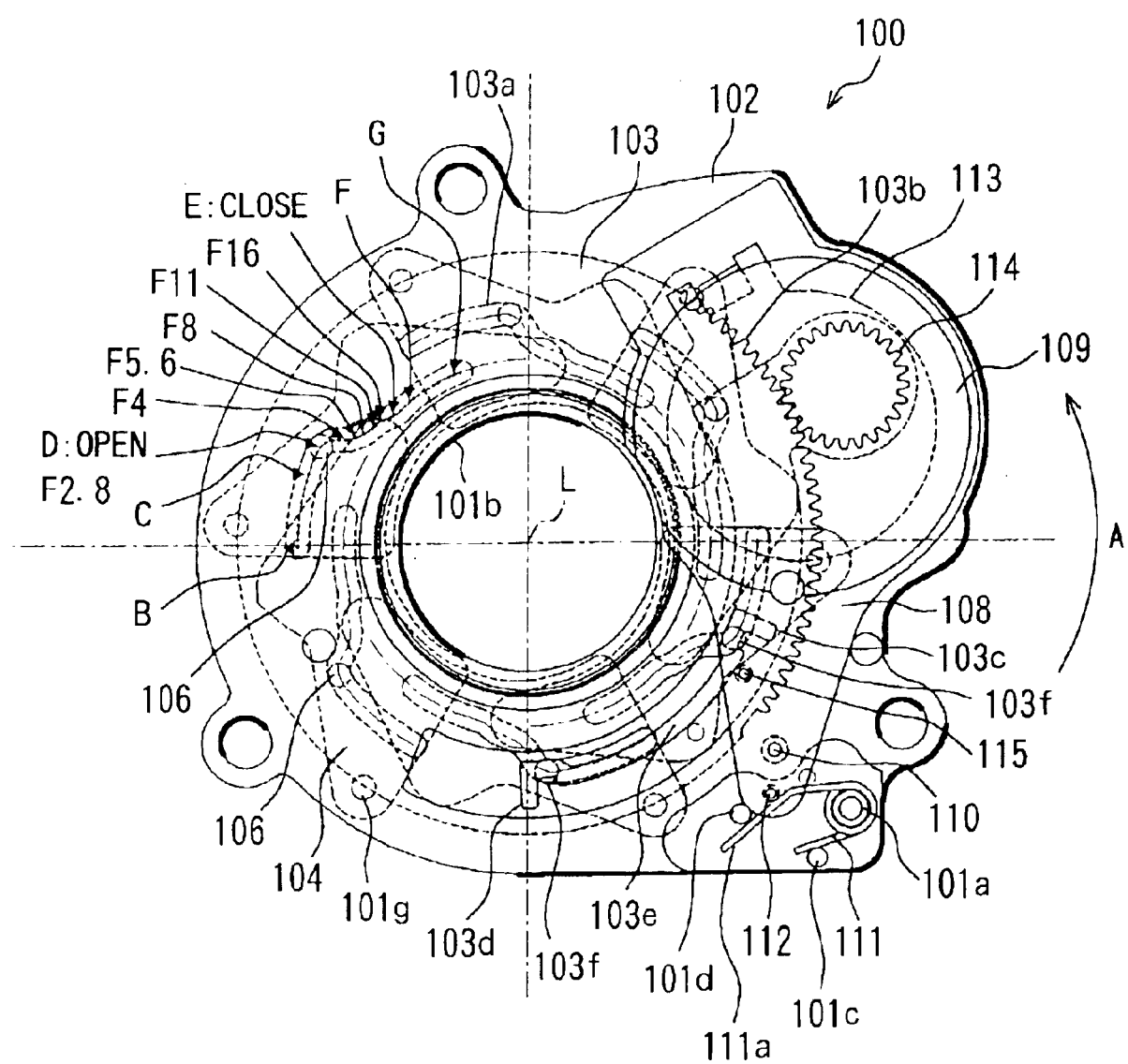
FIG. 1 is a diagram illustrating the situation when a light-quantity adjusting apparatus according to Embodiment 1 of the present invention is in the open position, and its ND filter is withdrawn.
Figure 2:
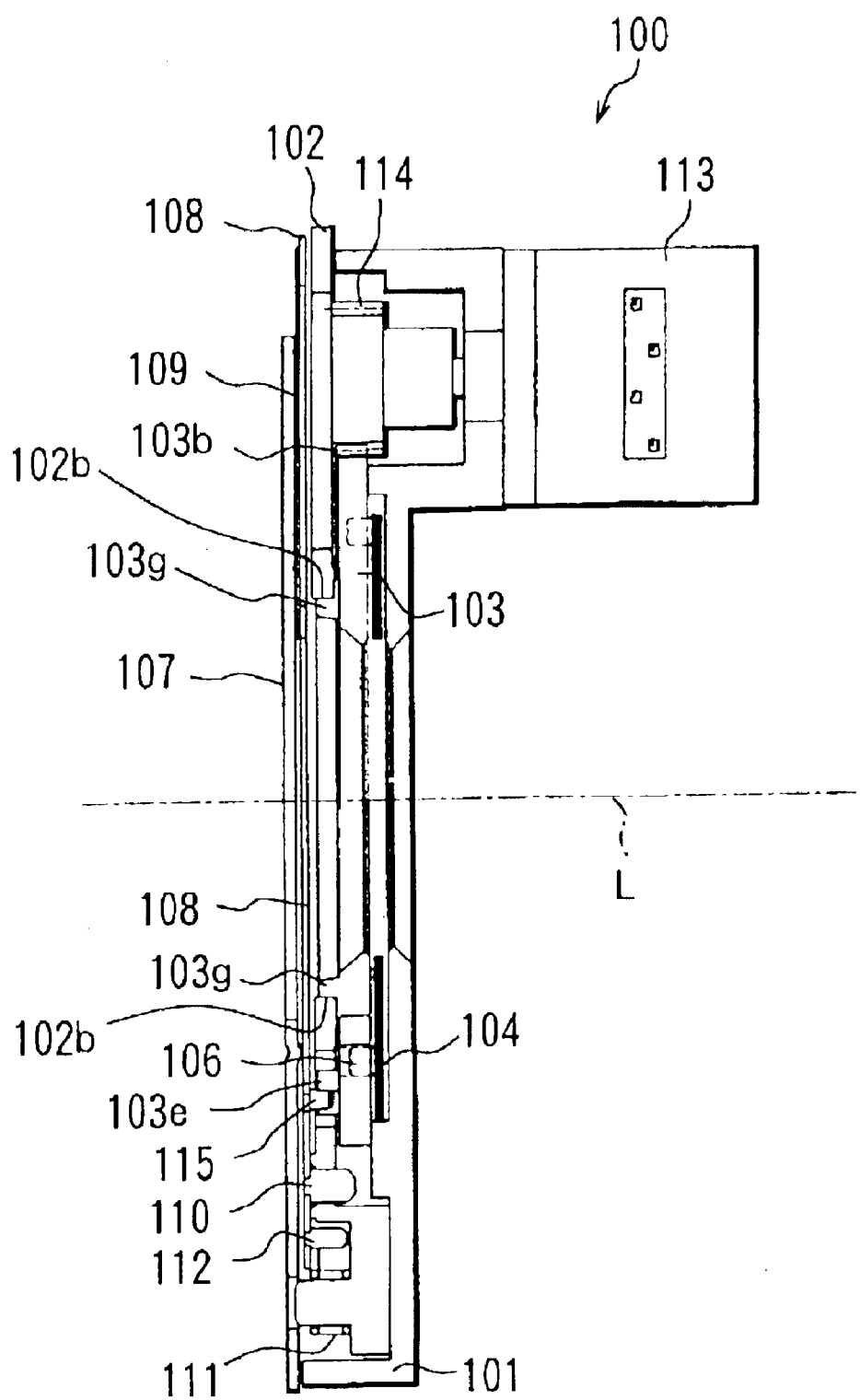
FIG. 2 is a diagram showing a vertical cross section of the light-quantity adjusting apparatus shown in FIG. 1.
Figure 3:
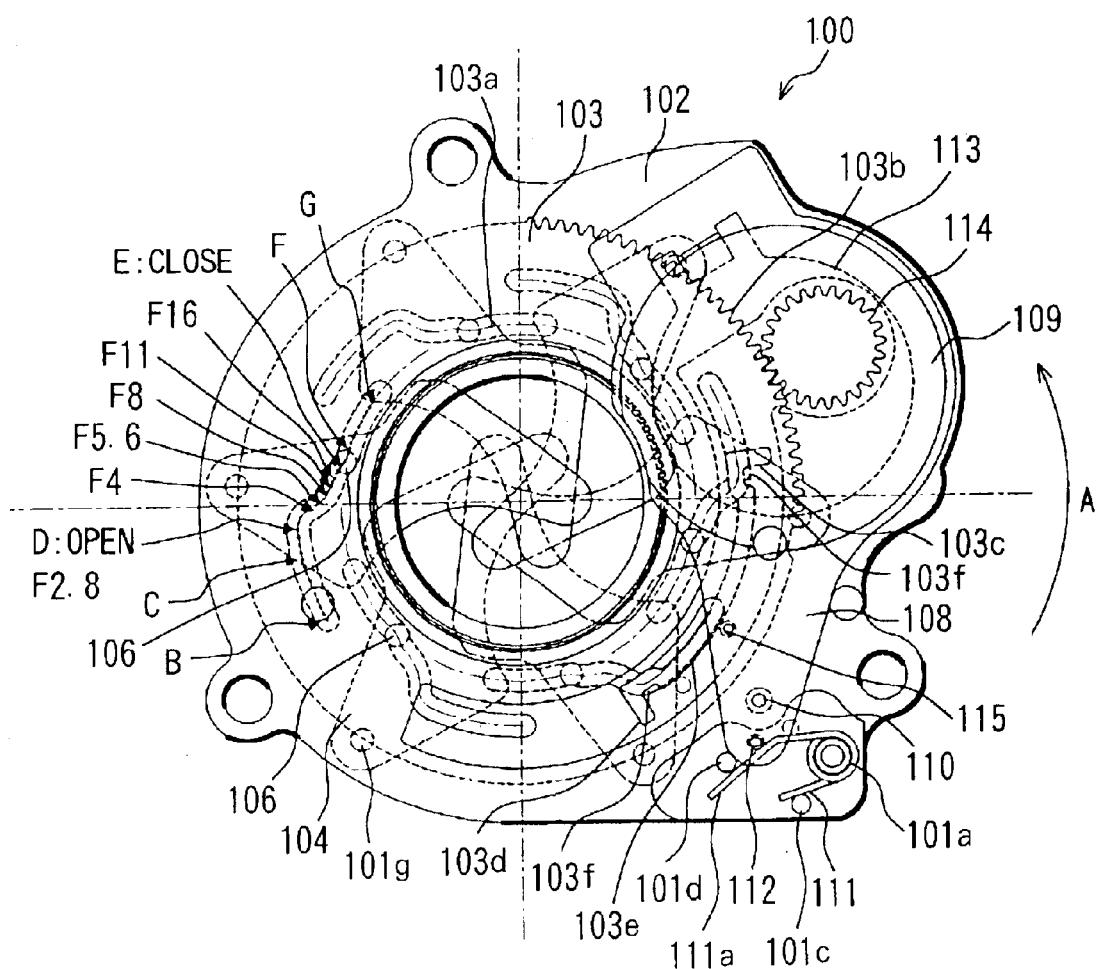
FIG. 3 is a diagram of the light-quantity adjusting apparatus in FIG. 1 illustrating the situation when the windmill member is rotated from the situation shown in FIG. 1, and the diaphragm blades are drawn together.
Figure 4:
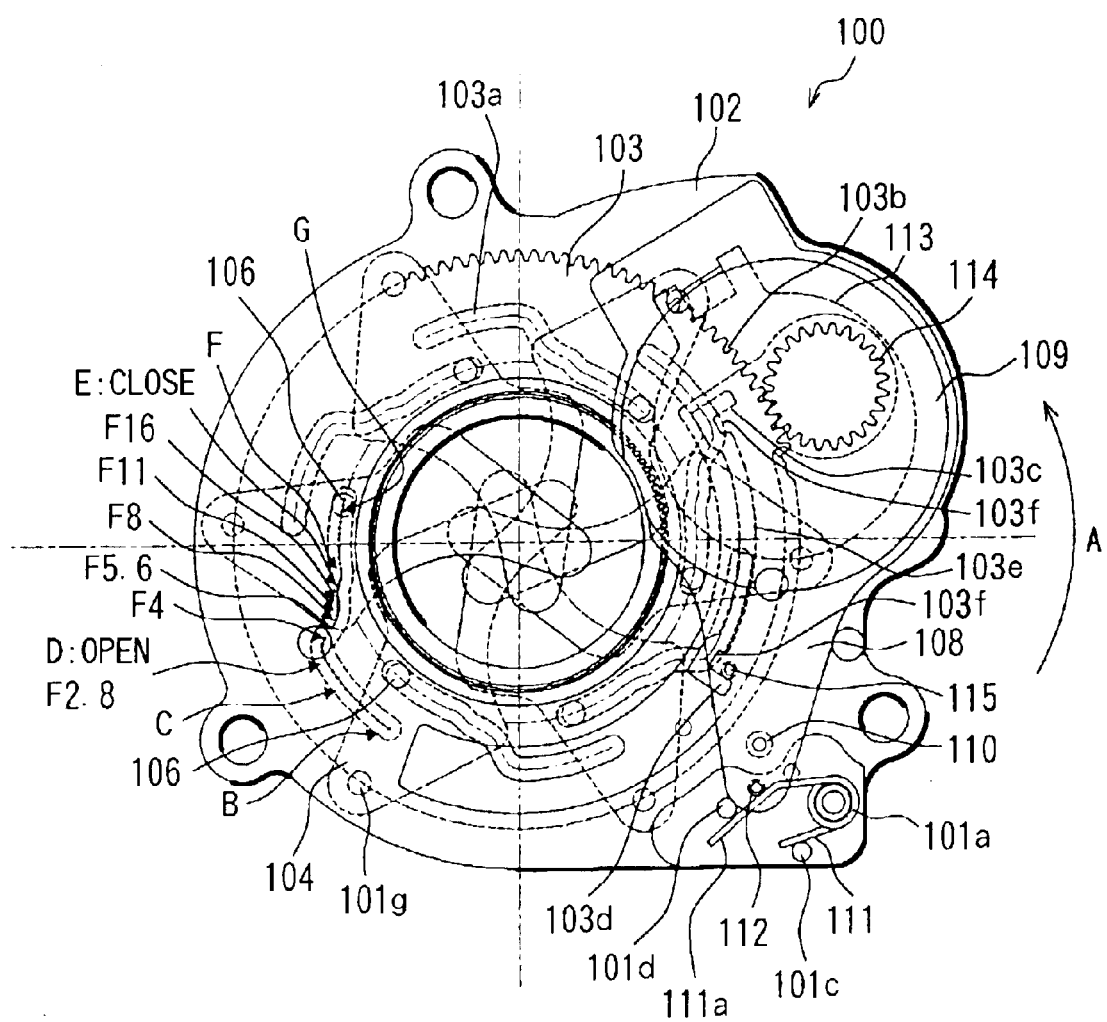
FIG. 4 is a diagram of the light-quantity adjusting apparatus in FIG. 1 illustrating the situation when the windmill member is further rotated from the situation shown in FIG. 3 to the mechanical limit.
Figure 5:
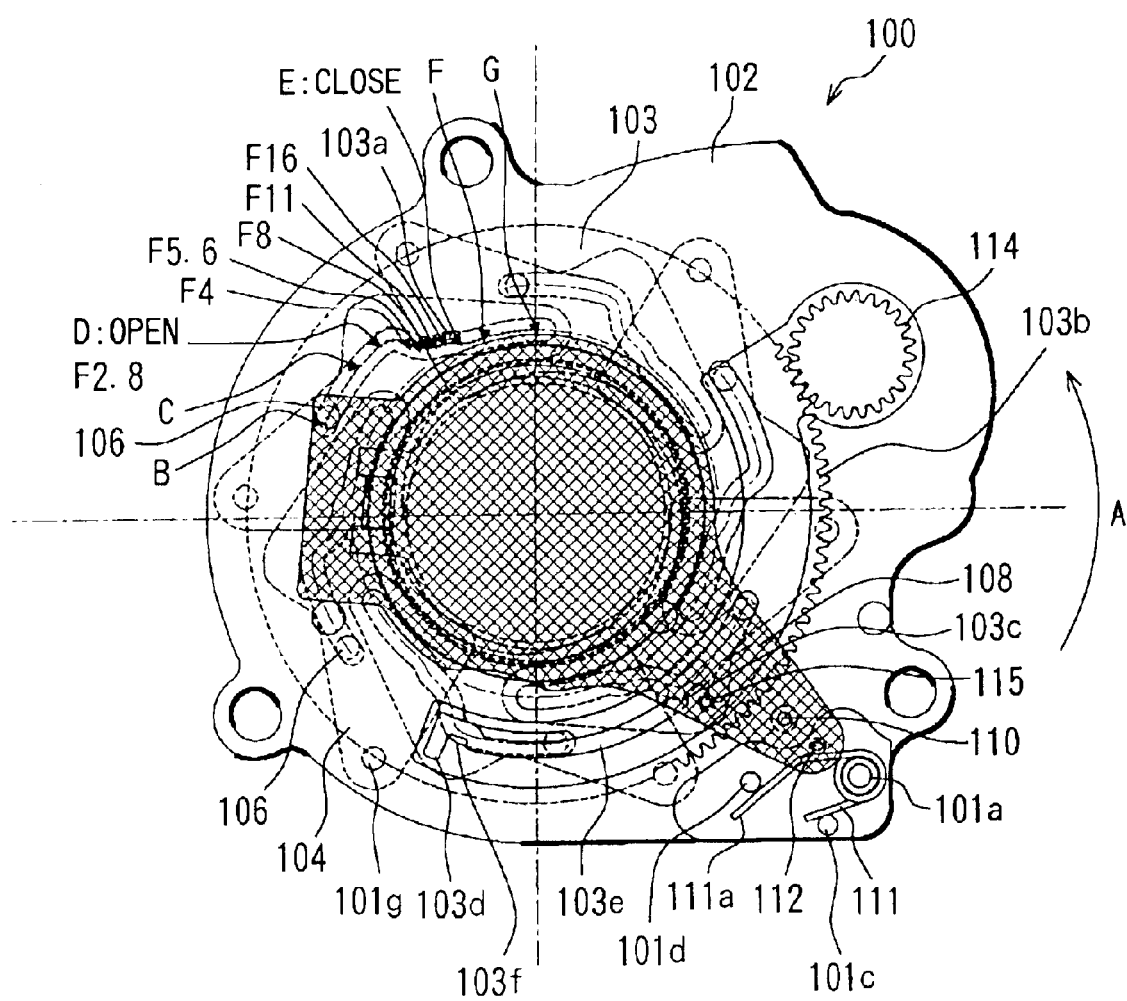
FIG. 5 is a diagram of the light-quantity adjusting apparatus in FIG. 1 illustrating the situation when the windmill member is rotated from the situation shown in FIG. 1, and the ND filter is inserted.
Figure 6:
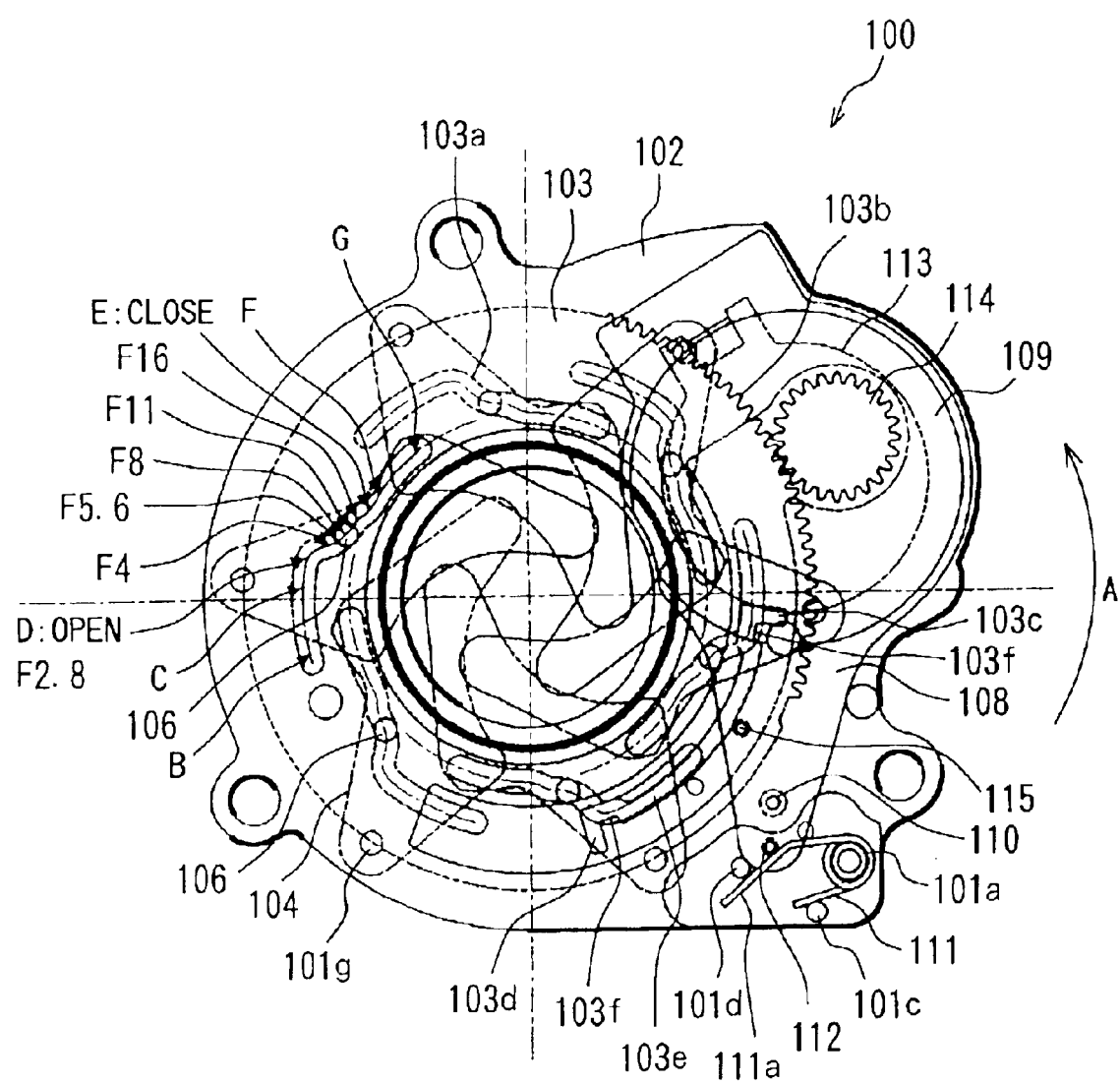
FIG. 6 is a diagram of the light-quantity adjusting apparatus in FIG. 1 illustrating the situation when the windmill member is rotated from the situation shown in FIG. 1 to a predetermined aperture diameter.
Figure 7:
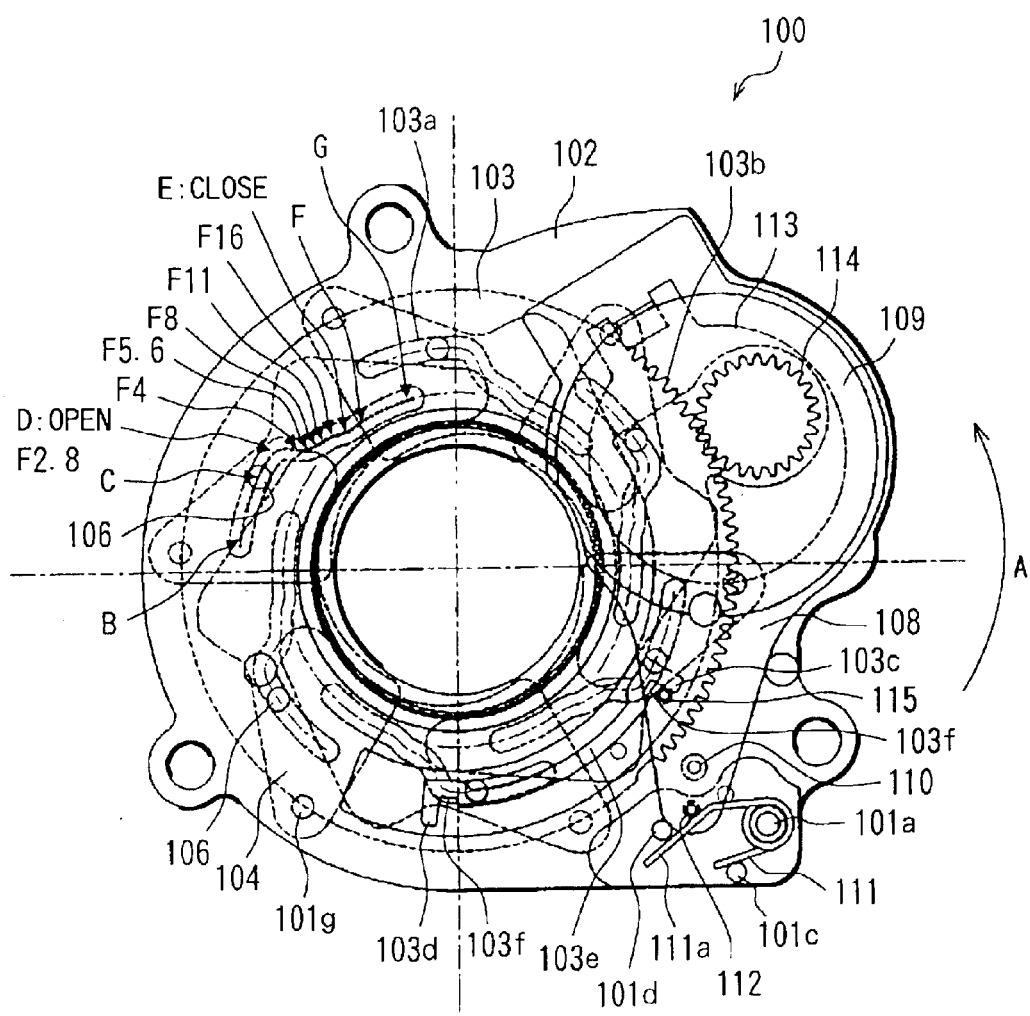
FIG. 7 is a diagram of the light-quantity adjusting apparatus in FIG. 1 illustrating the situation when the windmill member is rotated from the situation shown in FIG. 1 and the aperture diameter is open.
Figure 18:
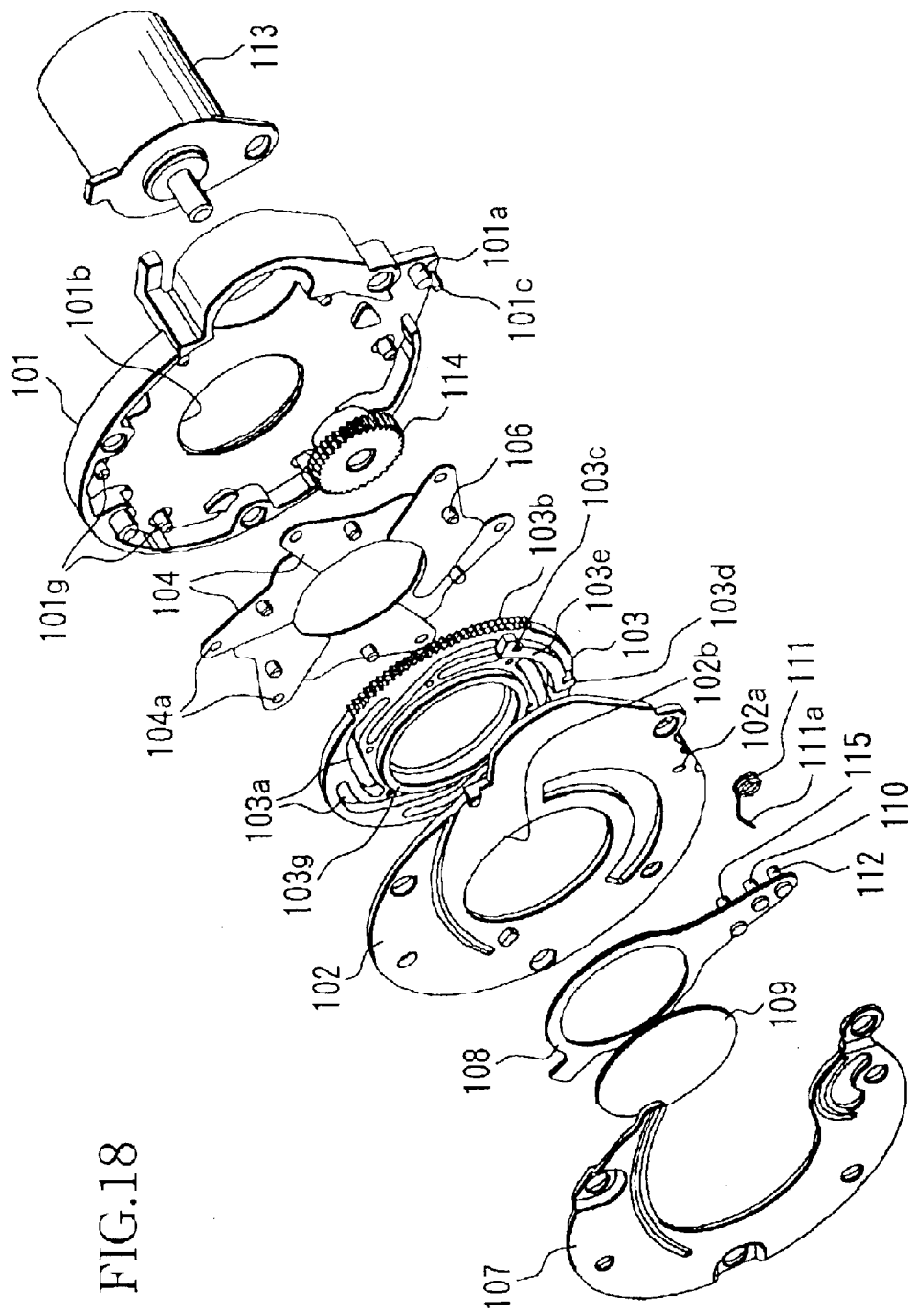
FIG. 18 is an exploded perspective view of the light-quantity adjusting apparatus of Embodiment 1.

FIG. 18 and FIGS. 1 through 7 illustrate the structure and operation of a light-quantity adjusting apparatus 100 according to Embodiment 1 of the present invention. FIG. 18 is an exploded perspective view of the light-quantity adjusting apparatus. FIG. 1 is a diagram illustrating the situation when the diaphragm-shutter blades (in the following referred to simply as "diaphragm blades") are in an open position, and the ND filter is withdrawn from (moved out of) the optical path. FIG. 2 is a diagram showing a vertical cross section of the light-quantity adjusting apparatus shown in FIG. 1. FIG. 3 is a diagram illustrating the situation when the windmill member is rotated from the situation shown in FIG. 1, and the diaphragm blades are moved to a completely closed position. FIG. 4 is a diagram illustrating the situation when the windmill member is further rotated from the situation shown in FIG. 3 to the mechanical limit. FIG. 5 is a diagram illustrating the situation when the windmill member is rotated from the situation shown in FIG. 1, and the ND filter is inserted (moved) into the optical path. FIG. 6 is a diagram illustrating the situation when the windmill member is rotated from the situation shown in FIG. 1 to a predetermined aperture diameter. FIG. 7 is a diagram illustrating the situation when the windmill member is rotated from the situation shown in FIG. 1 and the aperture diameter is open.

In these figures, numeral 101 denotes a base plate serving as the main unit of the light-quantity adjusting apparatus 100. A fixed aperture portion 100b (see FIGS. 1 and 18) is formed in the center of this base plate 101. Numeral 102 denotes a partition plate that is attached to the base plate 101, and numeral 103 denotes a windmill member (rotating member) that is disposed between the base plate 101 and the partition plate 102. By fitting the outer circumference of a cylindrical portion 103g (see FIGS. 2 and 18) at the center of the windmill member 103 to the inner circumference of a fixed aperture portion 102b formed in the center of the partition plate 102, the windmill member 103 is held such that it can be rotated around the optical axis L.

Numeral 104 denotes diaphragm blades (light-blocking member), which are disposed in the space between the base plate 101 and the windmill member 103. In this embodiment, six equally shaped diaphragm blades 104 are used. It should be noted that there is no limitation to six diaphragm blades, and other numbers are also possible. Holes 104a are formed at the base end of each diaphragm blade 104 (see FIG. 18), and by fitting fixing pins 101g provided on the base plate 101 into these holes 104a, the diaphragm blades 104 are supported such that they are rotatable around the fixing pins 101g.

Numeral 106 denotes cam pins that are attached to the diaphragm blades 104, and these cam pins 106 are engaged with cam grooves (light-blocking member driving portions) 103a that are formed in the windmill member 103. Thus, when the windmill member 103 is rotated, the cam pins 106 are shifted along the cam grooves 103a, thereby rotating the diaphragm blades 104 around the fixing pins 101g between an open position and a closed position. By rotating all six diaphragm blades 104 in the same fashion, the diameter of the diaphragm aperture formed by these six diaphragm blades 104 is changed, and also the light quantity passing through the diaphragm aperture is changed.

Numeral 107 in FIG. 18 denotes a presser plate fixed to the base plate 101 with the partition plate 102 arranged between the presser plate 107 and the base plate 101, and numeral 108, which is shown in all figures, denotes a filter holding frame which is disposed between the partition plate 102 and the presser plate 107. A filter rotation shaft 110 is attached to the base end of this filter holding frame 108, and this filter rotation shaft 110 is fitted to a hole 102a that is formed in the partition plate 102. The filter holding frame 108 can rotate around this rotation shaft 110.

Numeral 109 denotes an ND filter that is attached to the front side of the filter holding frame 108, and the light quantity passing through this filter is attenuated by providing the ND filter 109 with a predetermined transmissivity (density).

Numeral 111 denotes a biasing spring made of a twisted coil spring, whose coil portion is attached to a spring holding shaft 111a provided on the base plate 101.

Numeral 112 is a biasing pin attached to the filter holding frame 108. When the filter holding frame 108 (that is, the ND filter 109) is in a position in which it is inserted (moved) into the optical path (referred to as "insertion position" in the following), then this biasing pin 112 abuts the arm portion (of the two arm portions) of the biasing spring 111 that abuts against the spring receiving shaft 101d attached to the base plate 101 (that is, the arm portion 111a that is midway bent at an obtuse angle) at a location that is further on the base end side than the bent portion of that arm portion, so that the filter holding frame 108 is held in this state of being biased to the insertion position.

When the filter holding frame 108 (ND filter 109) is in a position in which it is withdrawn from (moved out of) the optical path (referred to as "withdrawn position" in the following), then the biasing pin 112 abuts the arm portion at a location that is further on the tip end side than the bent portion of that arm portion 111a, so that the filter holding frame 108 is held in this state of being biased to the withdrawn position.

It should be noted that the other arm portion of the biasing spring 111 abuts against a spring receiving shaft 101c provided on the base plate 101.

Numeral 113 denotes a stepping motor (actuator). Numeral 114 denotes an output pinion of the stepping motor 113, which meshes with a windmill gear portion 103b that is formed on a portion of the circumference of the windmill member 103.

Numeral 115 denotes a rotation pin attached to the filter holding frame 108. The filter holding frame 108 is rotated around the filter rotation shaft 110 by pushing this rotation pin 115 with an insertion protrusion 103c and a withdrawn protrusion 103d (filter driving portion) formed on the windmill member 103. Moreover, the rotation pin 115 abuts (slides) against the outer circumference of an arc-shaped protrusion (filter movement prevention portion) 103e formed between the insertion protrusion 103c and the withdrawn protrusion 103d on the windmill member 103, so that it also plays the role of preventing rotation of the filter holding frame 108 at times at which the filter is not being inserted and not being moved out.

In FIGS. 1 to 7, the dotted circles drawn on the center line through the cam grooves 103a of the windmill member 103 express the positions of the cam pins 106 of the diaphragm blades 104 that shift within the cam grooves 103a whenever the windmill member 103 is moved by one step with the stepping motor 113. Moreover, FIG. 1 illustrates an open state, in which the cam pins 106 are positioned in the position D in the cam grooves 103a, whereas FIG. 3 illustrates a closed state, in which the cam pins 106 are positioned in the position E in the cam grooves 103a.

Rotating the windmill member 103 from the open state in FIG. 1 in the direction opposite to direction A in the figure (that is, further in the opening direction), the rotation pin 115 is pushed by the insertion protrusion 103c of the windmill member 103, and the filter holding frame 108, which is in the withdrawn position, is rotated in counterclockwise direction in the figure around the filter rotation shaft 110, while the cam pins 106 are shifted over the region from C to B of the cam grooves 103a, as shown in FIG. 7. Thus, the ND filter 109 is inserted into the optical path, as shown in FIG. 5.

In the region between C and B, there is no lift change of the cam grooves 103a with respect to the radial direction of the windmill member, so that the diaphragm blades 104 stay in the open position (that is, the same position as when the cam pins 106 are in position D).

It should be noted that as shown in FIG. 6, by shifting the cam pins 106 through the region between D and E of the cam grooves 103a, the diaphragm blades 104 are opened and closed and the diaphragm diameter is changed, making it possible to adjust the light quantity that passes through the diaphragm aperture.

For example, when the stepping motor 113 is rotated for four steps from position D, the position "F4" is attained, which is the position that is one level narrower than the open position. Rotating two steps further, the position "F5.6" is attained, which is one more level narrower. And rotating two, four or six steps further, the aperture is gradually narrowed to "F8," "F11" and "F16," respectively. When the stepping motor 113 is rotated four more steps from the "F16" position, the diaphragm blades 104 are in the completely closed position (position E).

Between "F4" and "F16," every two steps of the stepping motor 113 change the aperture by one level, whereas between the open position and "F4," there is an interval of four steps. The reason for this is that in the direction opening even further from the "open" position (that is, the direction towards the positions C and B), the cam grooves 103a are formed with a smooth curve such that the diaphragm blades 104 are not spread further outward (that is to say, the diaphragm blades 104 are kept in the open position), and if the cam grooves 103a are formed with a steep curve between "open" and "F4," then the mobility of the diaphragm blades 104 in the region around the open position D becomes poor. Thus, an interval of four steps is provided between "open" and "F4" so there is a large curvature at the region around the open position in the cam grooves 103a.

Also between "F16" and the closed position (position E), two steps would lead to a small curvature of the cam grooves 103a, worsening the mobility of the diaphragm blades 104 at that location, so that an interval of four steps is set to enlarge the curvature.

It should be noted that the region between D and C serves as a rotation margin region (region of a predetermined amount) that ensures that the insertion protrusion 103c is not pushed against the filter holding frame 108 (rotation pin 115), and the filter holding frame 108 is not shifted in the insertion direction when the windmill member 103 is rotated at high speed from the closed side towards the open position D, and the windmill member 103 and the cam pins 106 overshoot the open position D.

By rotating the windmill member 103 from the mechanical limit position (position B) on the open side in FIG. 5 in the direction A (closing direction), the rotation pin 115 of the filter holding frame 108, which is in the insertion position, is pushed by the withdrawn protrusion 103d of the windmill member 103 when the cam pins 106 are shifted over the region from F to G in the cam grooves 103a, so that the filter holding frame 108 is rotated clockwise in FIG. 5 around the filter rotation shaft 110. This withdraws the ND filter 109 from the optical path, as shown in FIG. 4.

In the region between F and G, there is no lift change of the cam grooves 103a with respect radial direction of the windmill member 103, so that the diaphragm blades 104 are held in the closed position (same position as when the cam pins 106 are in position E).

It should be noted that the region between E and F serves as a rotation margin region (region of a predetermined amount) that ensures that the withdrawn protrusion 103d is not pushed against the filter holding frame 108 (rotation pin 115), and the filter holding frame 108 is not shifted in the withdrawn direction when the windmill member 103 is rotated at high speed from the open side towards the closed position E, and the windmill member 103 and the cam pins 106 overshoot the open position E.

Moreover, since the rotation pin 115 is slightly displaced in the radial direction of the windmill member 103 when the insertion protrusion 103c and the withdrawn protrusion 103d push against and rotate the filter holding frame 108 (rotation pin 115), depressions 103f that can take up the rotation pin 115 are formed in both ends in circumferential direction of the arc-shaped protrusion 103e.

Figure 19:
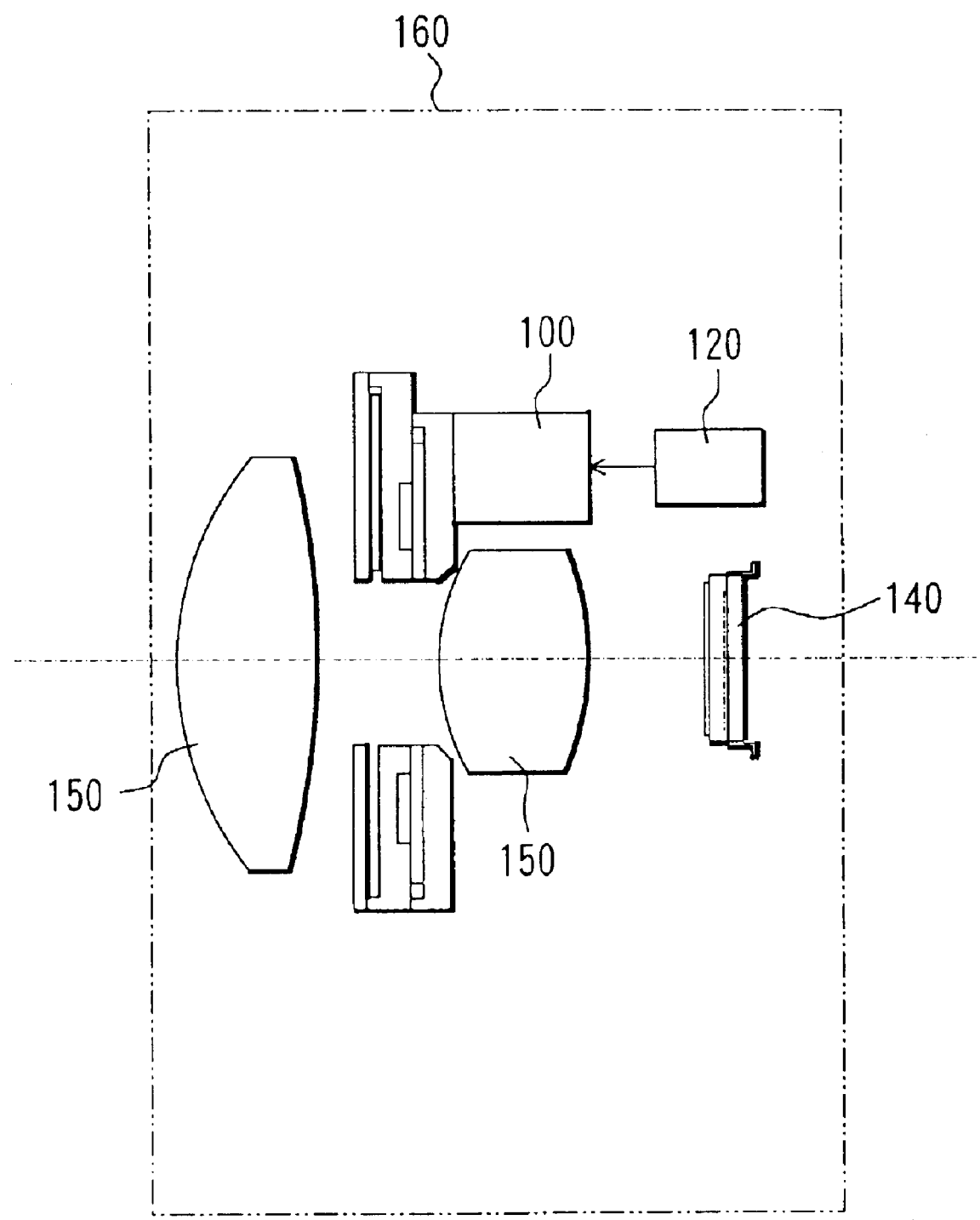
FIG. 19 is a cross-sectional view of a digital camera equipped with a light-quantity adjusting apparatus according to any of the embodiments of the present invention.
Figure 20:
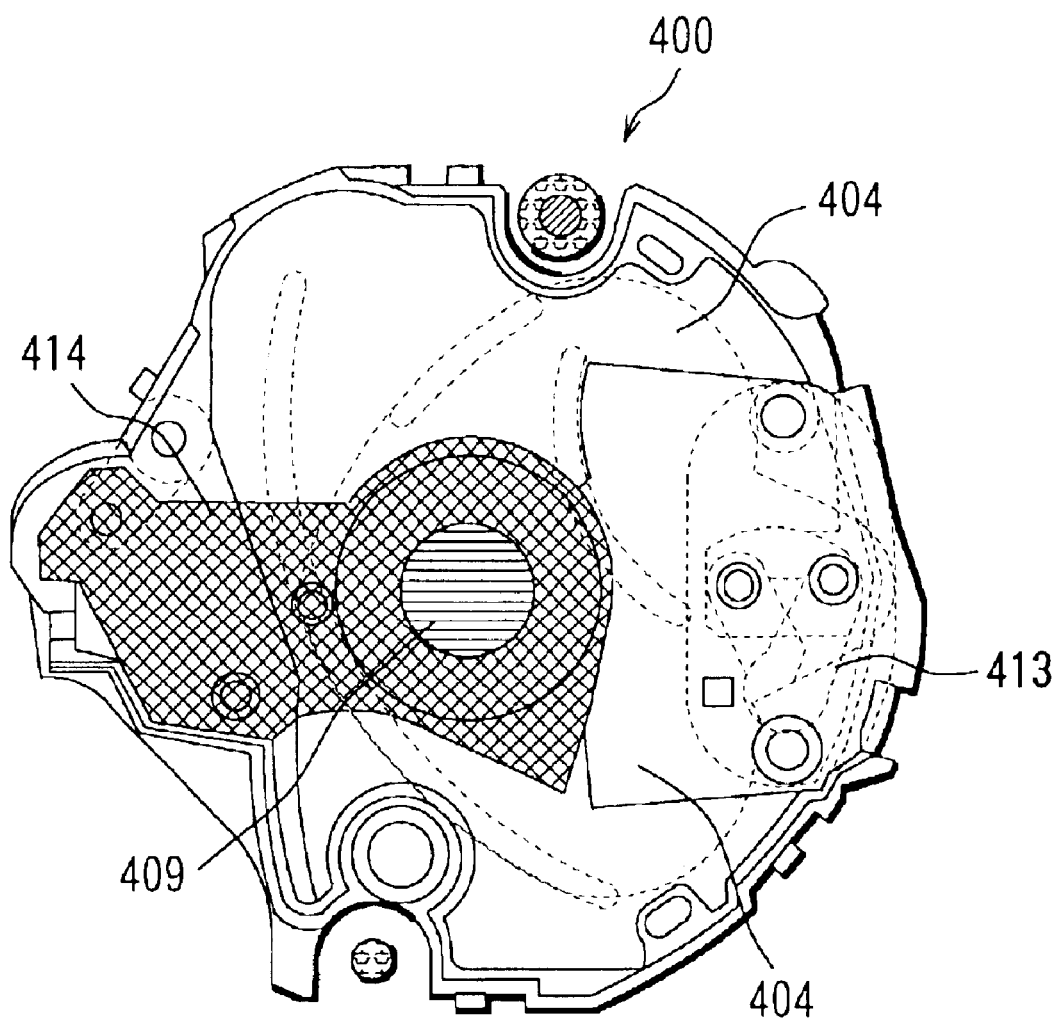
FIG. 20 is a front view of a conventional light-quantity adjusting apparatus.

The light-quantity adjusting apparatus 100 with a structure as described above is mounted in an imaging optical system of a digital still camera 160 as shown in FIG. 19, for example. In FIG. 19, numeral 150 denotes an imaging lens that constitutes an imaging optical system together with the light-quantity adjusting apparatus 100. Numeral 140 denotes an image pickup device 140, such as a CCD or CMOS, for photoelectric conversion of the object image that is formed by the imaging optical system.

An image signal formed by photoelectric conversion with the image pickup device is subjected to predetermined processing with a signal processing circuit not shown in the drawings, and stored in a recording medium (such as a semiconductor memory) which is not shown in the drawings.

It should be noted that the light-quantity adjusting apparatus of this embodiment can be installed not only in digital still cameras, but also in video cameras, film cameras, or exchangeable lens systems for such cameras.

Figure 8:
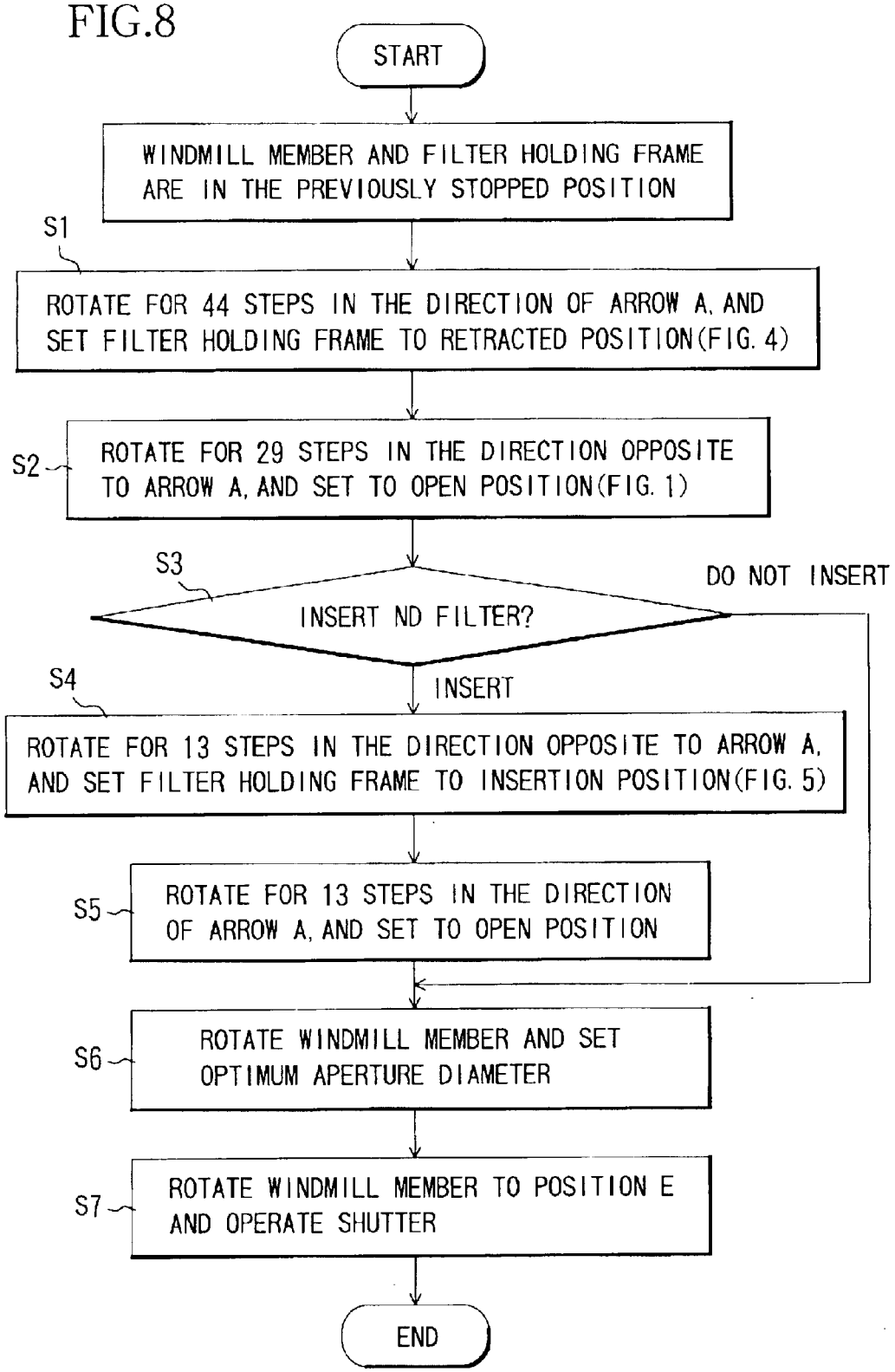
FIGS. 8 and 9 are flowcharts illustrating the operation of the light-quantity adjusting apparatus in FIG. 1.

Referring to FIG. 8, the following is an explanation of the control operation (from the initialization settings to the imaging operation) of this light-quantity adjusting apparatus. This control operation is carried out by controlling the stepping motor 113 with a control circuit 120 shown in FIG. 19 (or a control circuit for diaphragm adjustment) installed in the camera. First, when power is supplied to the camera and the control circuit 120, the windmill member 103 (diaphragm blades 104) and the filter holding frame 108 are in positions in which they were previously stopped.

Step 1

As the initialization operation, by rotating the stepping motor 113, the control circuit 120 lets the windmill member 103 rotate in the direction of that arrow A in FIGS. 1 to 7 at least to a maximum rotation angle that is defined by the circumferential length of the cam grooves 103a (for example, rotating the stepping motor 113 for 44 steps). At a certain conductive status at which the cam pins 106 are in the position G (that is, at the mechanical limit position on the closed side) of the cam grooves 103a, the control circuit 120 stops the stepping motor 113. Thus, as shown in FIG. 4, the diaphragm blades 104 are brought into the closed position, and the withdrawn protrusion 103d pushes against the rotation pin 115, so that the filter holding frame 108 is positioned in the withdrawn position.

Step 2

Then, the control circuit 120 makes the stepping motor 113 rotate at a predetermined high speed for a predetermined number of pulses (29 pulses) such that the cam pins 106 are positioned in position D, and makes the windmill member 103 rotate at high speed in the direction opposite to the direction of the arrow A. When rotating the windmill member 103 in this manner at high speed such that the cam pins 106 are positioned in the position D (open position), the windmill member 103 may overshoot to a position in which the cam pins 106 have passed beyond the position D, but since there is a margin of four steps before the insertion protrusion 103c provided on the windmill member 103 hits against the rotation pin 115 of the filter holding frame 108 (that is, before the cam pins 106 come into the position C), the insertion protrusion 103c does not hit against the rotation pin 115. Therefore, the filter holding frame 108 is not inserted into the optical path.

Moreover, as shown in FIG. 1, when the diaphragm blades 104 reach the open position, the filter holding frame 108 is biased to the withdrawn position by the biasing spring 111. This concludes the initialization position settings.

Step 3

Based on information such as the brightness of the object image measured by the camera, the control circuit 120 judges whether the ND filter 109 is to be inserted into the optical path, and if the ND filter 109 is inserted, the procedure advances to Step 4 to perform a filter insertion operation. If the ND filter 109 is not inserted into the optical path, then the procedure advances to Step 6 to set the aperture diameter.

Step 4

In this step, the insertion operation of the ND filter 109 is performed. The control circuit 120 makes the stepping motor 113 rotate for thirteen steps such that the windmill 103 is rotated in the direction opposite to the arrow A, and positions the cam pins 106 in the position B (mechanical limit position on the open side), as shown in FIG. 5.

As a result, the withdrawn protrusion 103c of the windmill member 103 is pushed against the rotation pin 115, the filter holding frame 108 is rotated, and the ND filter 109 is inserted in the optical path.

Step 5

The control circuit 120 makes the stepping motor 113 rotate for thirteen steps, rotating the windmill member 103 in the direction of the arrow A. Thus, the diaphragm blades 104 are positioned in the open position (that is, the cam pins 106 are in the position D), and the ND filter 109 assumes a state in which it is biased to the insertion position by the biasing spring 111. This concludes the filter insertion operation.

Step 6

Next, the diaphragm aperture formed by the diaphragm blades 104 is set to the optimum aperture diameter, based on the result of photometry or the like. That is to say, the control circuit 120 rotates the windmill member 103 by driving the stepping motor 113 such that the cam pins 106 are shifted within a range from the position D to the position "F16," setting the diaphragm aperture to the optimum aperture diameter.

FIG. 6 shows the situation when the stepping motor 113 has rotated for eight steps from the situation in FIG. 1 while the ND filter 109 is in the withdrawn position, thus setting the diaphragm aperture diameter to F8.

Step 7

Next, the shutter operation is carried out. The stepping motor 113 is rotated at high speed from the state in which the diaphragm blades 104 form the optimum aperture diameter such that the cam pins 106 are positioned in position E (closed position). Thus, a shutter operation from the open state to the closed state is carried out.

At this time, even if the windmill member 103 (cam pins 106) overshoots the position E, the withdrawn protrusion 103d provided on the windmill member 103 does not hit against the rotation pin 115 of the filter holding frame 108, since there is a margin of four steps before the withdrawn protrusion 103d hits against the rotation pin 115 (that is, before the cam pins 106 come into the position F). Therefore, the filter holding frame 108 is not withdrawn from the optical path. This concludes the entire imaging operation starting with the initialization settings.

In this embodiment, the filter holding frame 108 is rotated by pushing the rotation pin 115 with the insertion protrusion 103c and the withdrawn protrusion 103d, thus shifting or withdrawing the ND filter 109 with respect to the optical path, whereas in the range over which the diaphragm aperture diameter is changed, insertion and withdrawn of the ND filter 109 is prevented by abutting the rotation pin 115 against the arc-shaped protrusion 103e. Thus, even when a biasing spring 111 with a weak spring force is used, in the range over which the diaphragm aperture diameter is changed, the ND filter 109 will not be inadvertently moved by vibrations or the like, and when the ND filter 109 is to be inserted or withdrawn, then it can be moved easily, because the spring force of the biasing spring 111 is weak.

Moreover, the region from B to D and the region from F to G on the cam grooves 103a in which the ND filter 109 is shifted are displaced against one another in the radial direction of the windmill member 103, so that the rotation angle of the windmill member 103 can be made wide without mutual interference of cam grooves 103a that are next to one another in the circumferential direction.

Thus, since the rotation angle of the windmill member 103 for inserting and withdrawing the ND filter 109 can be made wide, the rotation pin 115 can be arranged at a position that is far away from the filter rotation shaft 110, which serves as the rotation center of the filter holding frame 108. Consequently, the filter holding frame 108 can be inserted and withdrawn with little force. This is advantageous for making the stepping motor 113 compact. The same is also true for the following embodiments.

It should be noted that in this embodiment, the ND filter 109 is inserted into the optical path by rotating the stepping motor 113 from the open position further in the opening direction, and the ND filter 109 is withdrawn from the optical path by rotating the stepping motor 113 from the closed position further in the closing position, but it is also possible to configure the device such that the ND filter is withdrawn from the optical path by rotating the stepping motor from the open position further in the opening direction, and that the ND filter is inserted into the optical path by rotating the stepping motor from the closed position further in the closing position.

Embodiment 2

Figure 9:
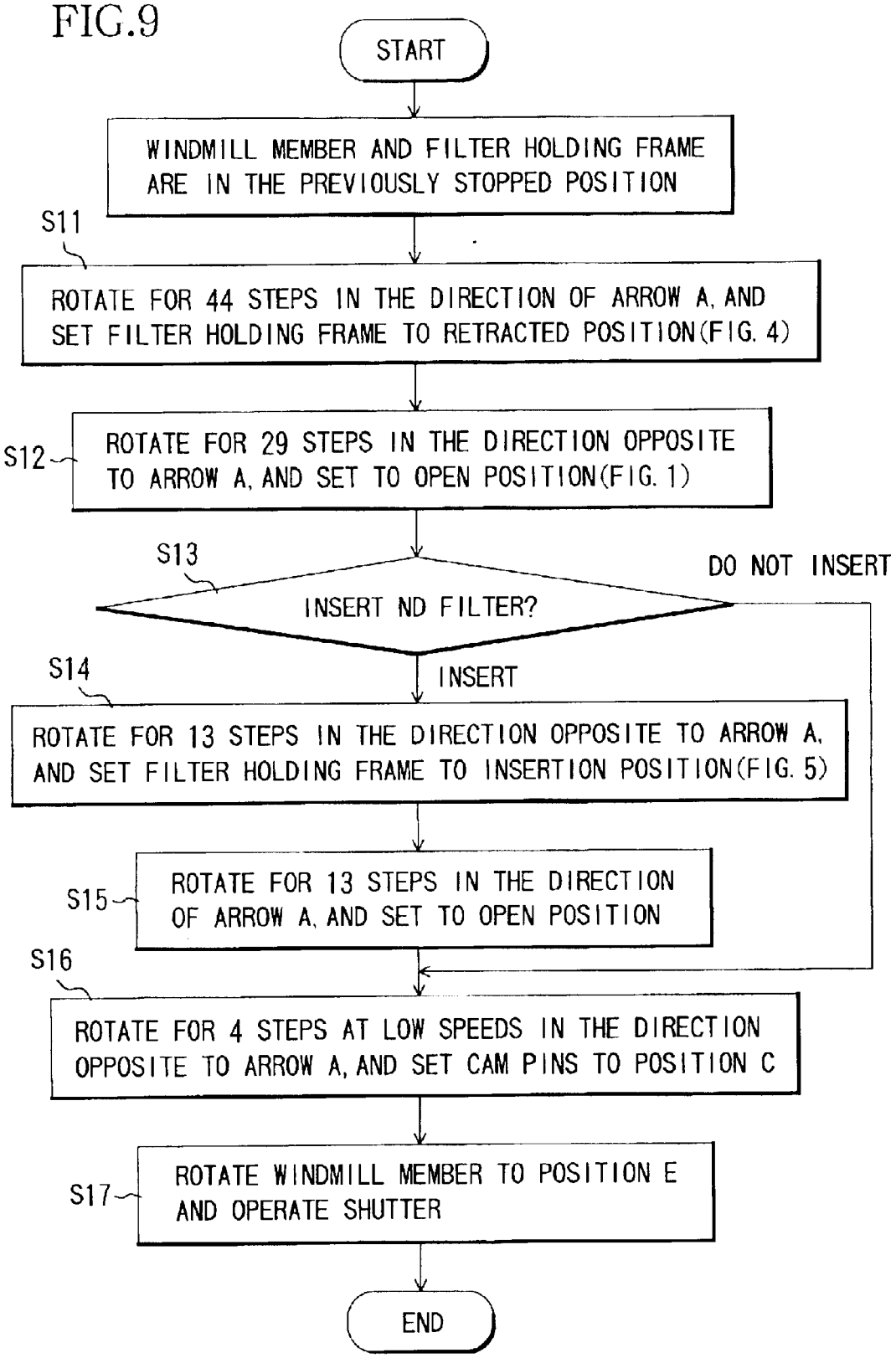

Referring to FIG. 9, the following is an explanation of a shutter operation of a light-quantity adjusting apparatus in accordance with Embodiment 2 of the present invention. The structure of the light-quantity adjusting apparatus of this embodiment is the same as that of Embodiment 1. Using the FIGS. 1 to 7 that were used in Embodiment 1, the following explanation uses the same reference numbers given to the structural elements in Embodiment 1.

First, when power is supplied to the camera and the control circuit 120, the windmill member 103 (diaphragm blades 104) and the filter holding frame 108 are in positions in which they were previously stopped.

Step 11

As the initialization operation, by rotating the stepping motor 113, the control circuit 120 makes the windmill member 103 rotate in the direction of the arrow A in FIGS. 1 to 7 at least to a maximum rotation angle that is defined by the circumferential length of the cam grooves 103a (for example, rotating the stepping motor 113 for 44 steps). At a certain conductive status at which the cam pins 106 are in the position G (that is, at the mechanical limit position on the closed side) of the cam grooves 103a, the control circuit 120 stops the stepping motor 113. Thus, as shown in FIG. 4, the diaphragm blades 104 are brought into the closed position, and the withdrawn protrusion 103d pushes against the rotation pin 115, so that the filter holding frame 108 is positioned in the withdrawn position.

Step 12

Then, the control circuit 120 makes the stepping motor 113 rotate at a predetermined high speed for a predetermined number of pulses (29 pulses) such that the cam pins 106 are positioned in position D, and makes the windmill member 103 rotate at high speed in the direction opposite to the direction of the arrow A. When rotating the windmill member 103 in this manner at high speed such that the cam pins 106 are positioned in the position D (open position), the windmill member 103 may overshoot to a position in which the cam pins 106 have passed beyond the position D, but since there is a margin of four steps before the insertion protrusion 103c provided on the windmill member 103 hits against the rotation pin 115 of the filter holding frame 108 (that is, before the cam pins 106 come into the position C), the insertion protrusion 103c does not hit against the rotation pin 115. Therefore, the filter holding frame 108 is not inserted into the optical path.

Moreover, as shown in FIG. 1, when the diaphragm blades 104 reach the open position, the filter holding frame 108 is biased to the withdrawn position by the biasing spring 111. This concludes the initialization position settings.

Step 13

Based on information such as the brightness of the object image measured by the camera, the control circuit 120 judges whether the ND filter 109 is to be inserted into the optical path, and if the ND filter 109 is inserted, the procedure advances to Step 14 to perform a filter insertion operation. If the ND filter 109 is not inserted into the optical path, then the procedure advances to Step 16.

Step 14

In this step, the insertion operation of the ND filter 109 is performed. The control circuit 120 makes the stepping motor 113 rotate for thirteen steps such that the windmill member 103 is rotated in the direction opposite to the arrow A, and positions the cam pins 106 in the position B (mechanical limit position on the open side), as shown in FIG. 5. Thereby, since the withdrawn protrusion 103c of the windmill member 103 pushes the rotation pin 115, the filter holding frame 108 is rotated, and then the ND filter 109 is inserted into the optical path.

Step 15

The control circuit 120 makes the stepping motor 113 rotate for thirteen steps, rotating the windmill member 103 in the direction of the arrow A. Thereby, the diaphragm blades 104 are positioned in the open position (that is, the cam pins 106 are in the position D), and the ND filter 109 becomes a state in which it is biased to the insertion position by the biasing spring 111. This concludes the filter insertion operation.

Step 16

Next, the control circuit 120 makes the stepping motor 113 rotate at a predetermined low speed for four steps such that the windmill member 103 is rotated in the direction opposite to the arrow A, and the cam pins 106 are shifted from the open position D to the position C. At this time, the reason why the stepping motor 113 is rotated at low speed is in order to avoid that the cam pins 106 overshoot from the position C towards the position B, thereby inserting the filter holding frame 118, which is in the withdrawn position.

Step 17

Next, the stepping motor 113 is rotated at high speed such that the cam pins 106 are shifted from the position C to the position E. Thus, the diaphragm blades (serving as shutter blades in this embodiment) 104 are switched at high speed from open to closed, and the shutter operation is carried out.

In this embodiment, when the stepping motor 113 and the windmill member 103 and the diaphragm blades 104 driven by it are operated from open to closed, there is an acceleration from the halted state over several (for example two to four) steps. Over the range of several steps from the position C, there is no change in the aperture diameter, and after having shifted by several steps (and reaching the position D), the aperture diameter changes, so that in the not completely accelerated range there is no change in the aperture diameter, and the aperture diameter changes only after the acceleration is substantially finished. Consequently, compared to the case that the shutter operation begins from the position D, the shutter speed, which starts from the change of the aperture diameter in the open state and ends in the closed state, can be made faster.

Furthermore, when the rotation speed of the stepping motor 113 is accelerated by making the pattern of driving pulses applied to the stepping motor 113 after exceeding past the position D an accelerating pattern, the speed of change of the aperture diameter increases, so that the shutter speed can be made even faster.

This control can also be applied to the other embodiments.

Embodiment 3

FIGS. 10 to 13 illustrate the structure and operation of a light-quantity adjusting apparatus 200 according to Embodiment 3 of the present invention.

Figure 10:
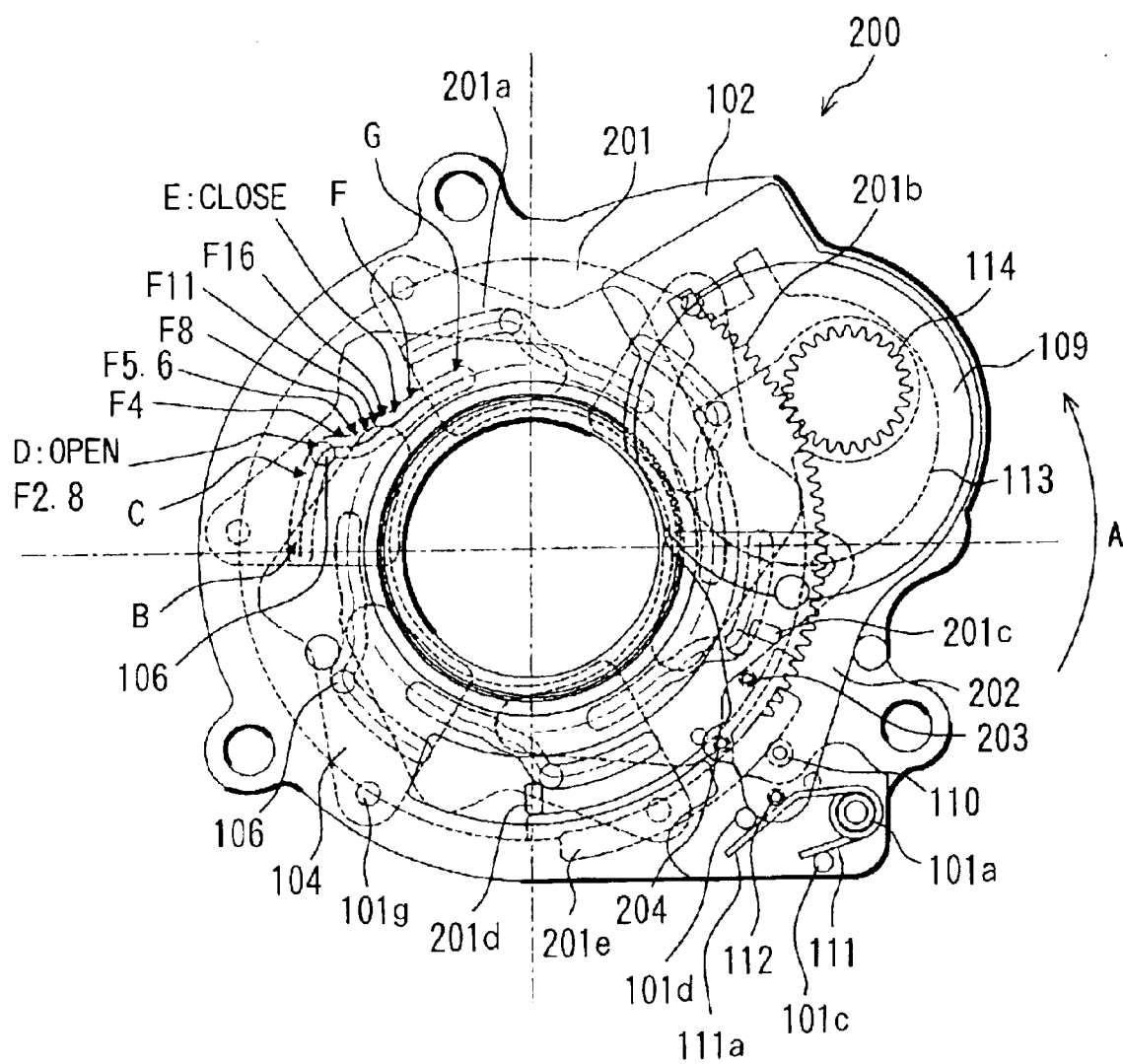
FIG. 10 is a diagram illustrating the situation when a light-quantity adjusting apparatus according to Embodiment 2 of the present invention is in the open position, and its ND filter is withdrawn.

FIG. 10 is a diagram illustrating the situation when the diaphragm-shutter blades (in the following referred to simply as "diaphragm blades") are in the open position, and the ND filter is withdrawn from (moved out of) the optical path.

Figure 11:
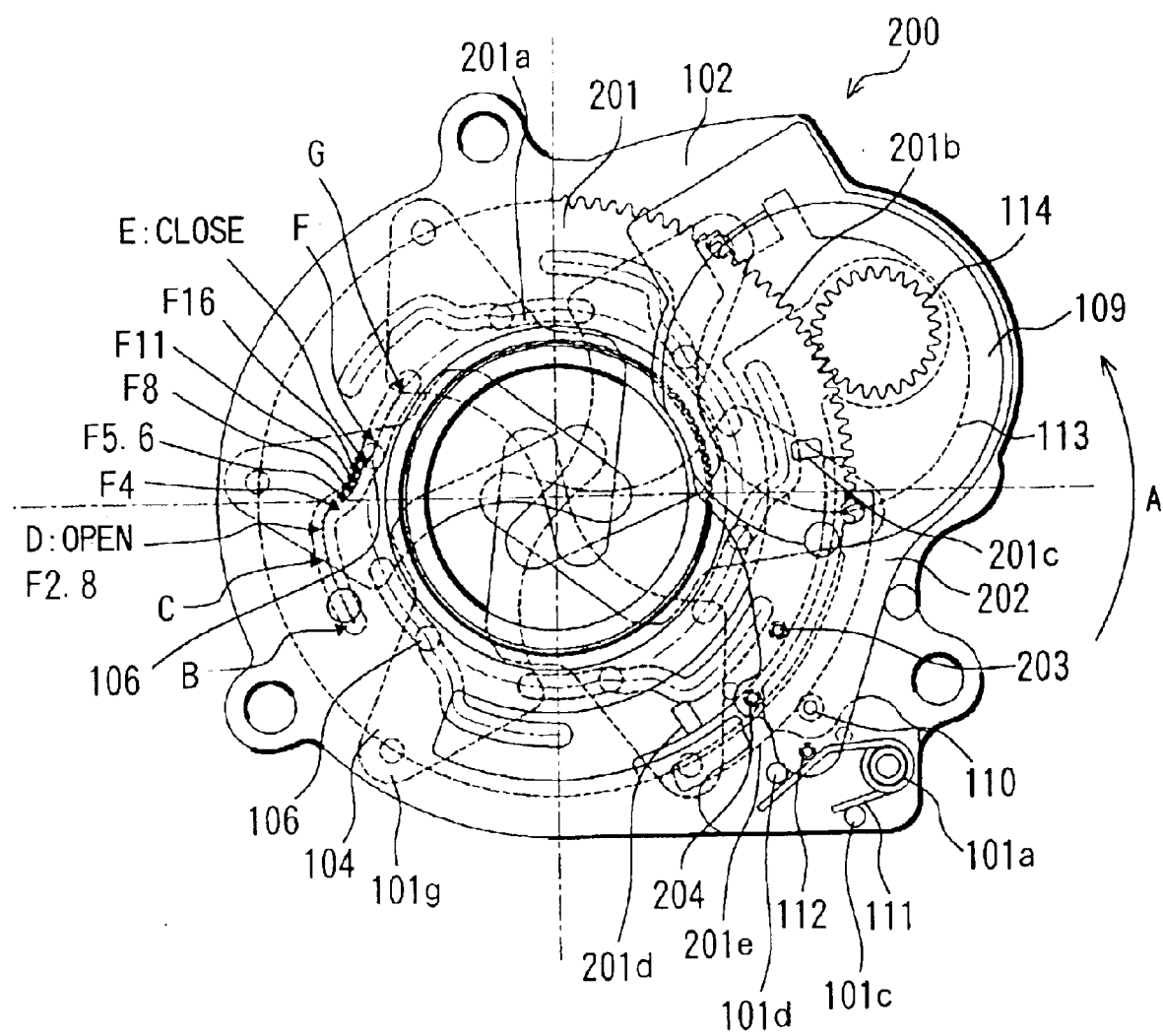
FIG. 11 is a diagram of the light-quantity adjusting apparatus in FIG. 10 illustrating the situation when the windmill member is rotated from the situation shown in FIG. 10, and the diaphragm blades are drawn together.
Figure 12:
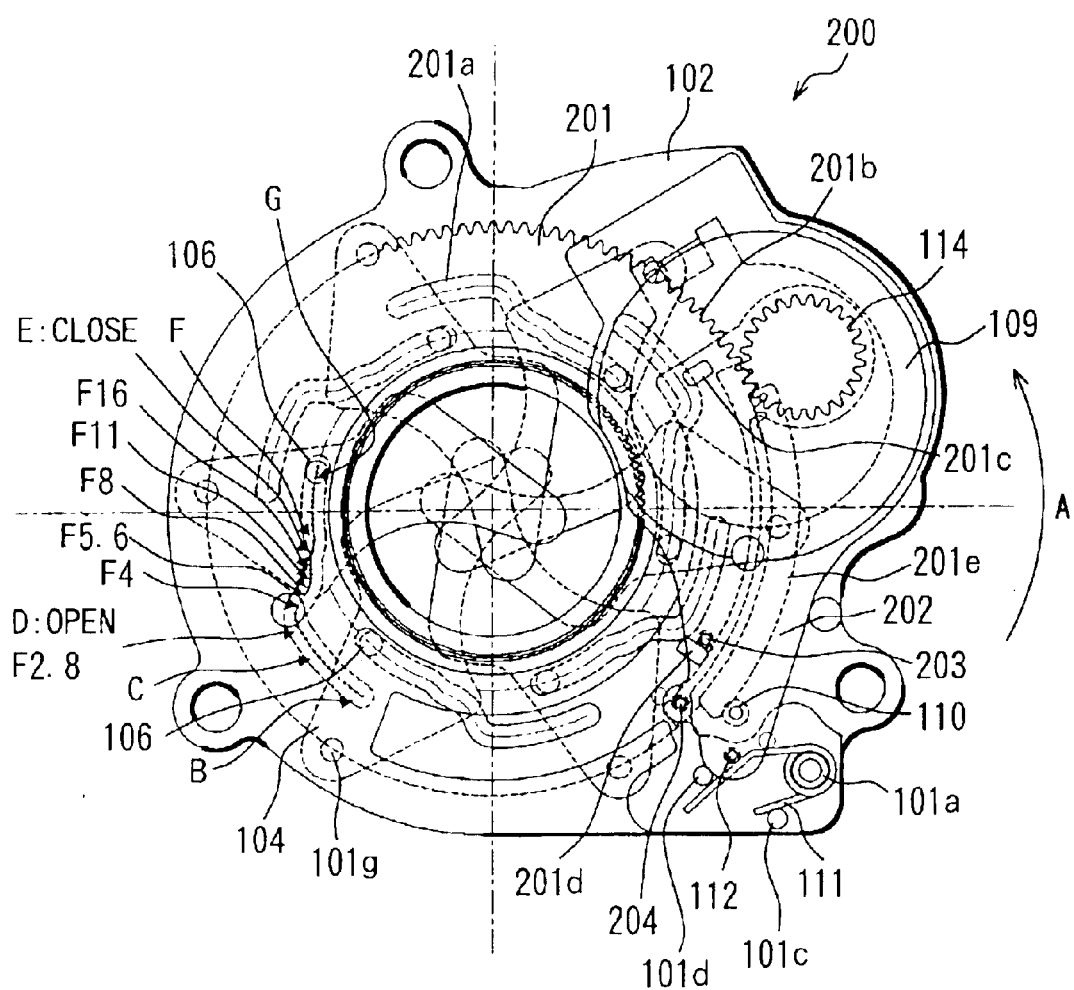
FIG. 12 is a diagram of the light-quantity adjusting apparatus in FIG. 10 illustrating the situation when the windmill member is further rotated from the situation shown in FIG. 11 to the mechanical limit.
Figure 13:
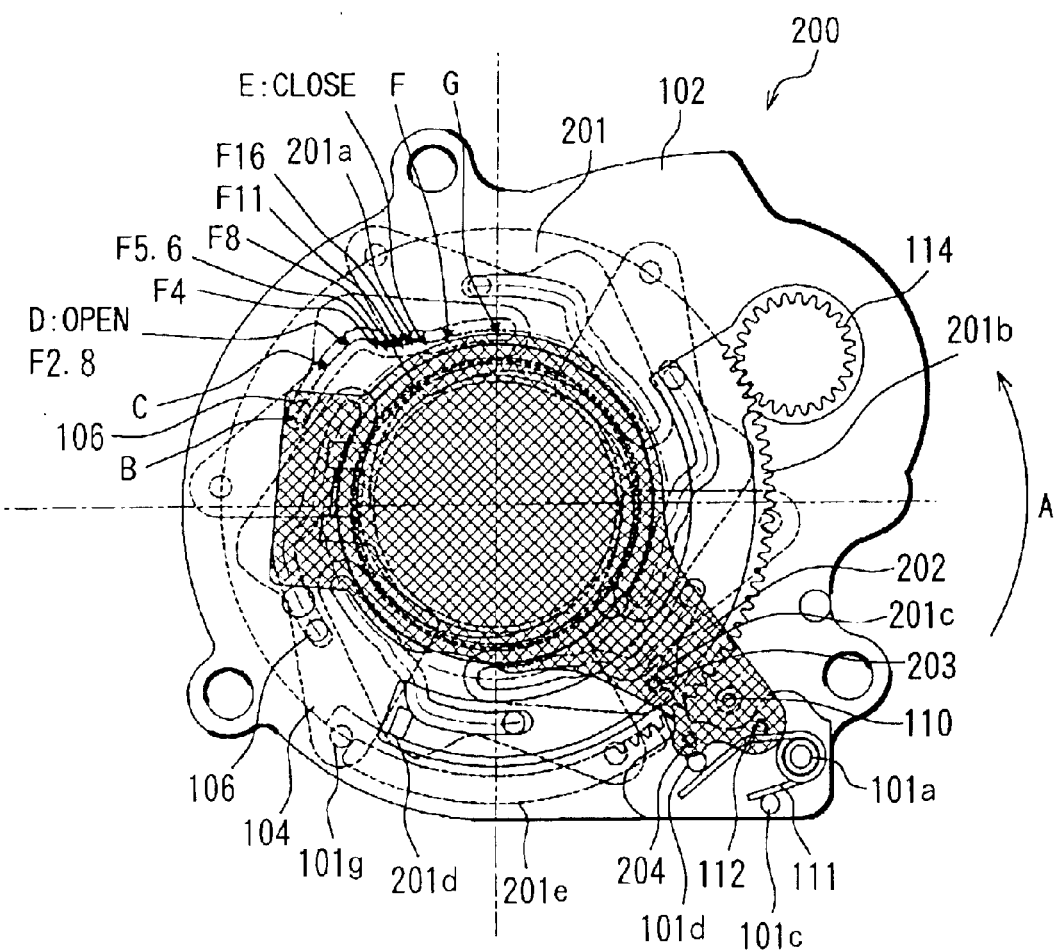
FIG. 13 is a diagram of the light-quantity adjusting apparatus in FIG. 10 illustrating the situation when the windmill member is rotated from the situation shown in FIG. 10, and the ND filter is inserted.

FIG. 11 is a diagram illustrating the situation when the windmill member is rotated from the situation shown in FIG. 10, and the diaphragm blades are moved to the completely closed position. FIG. 12 is a diagram illustrating the situation when the windmill member is further rotated from the situation shown in FIG. 11 to the mechanical limit. FIG. 13 is a diagram illustrating the situation when the windmill member is rotated from the situation shown in FIG. 10, and the ND filter is inserted into the optical path.

It should be noted that in this embodiment, structural elements that are common to Embodiment 1 are given the same reference numerals as in Embodiment 1. The present embodiment differs from Embodiment 1 with regard to the fact that the arc-shaped protrusion 201e of the windmill member 201 abuts on its inner circumferential side against a pin 204 that is provided separately from the rotation pin 203 of the filter holding frame 202.

In FIGS. 10 to 13, the windmill member 201, which has cam grooves 201a and a gear portion 201b that are similar to the ones in Embodiment 1, has an insertion protrusion 201c, a withdrawn protrusion 201d and an arc-shaped protrusion 201e. The insertion protrusion 201c, the withdrawn protrusion 201d and the arc-shaped protrusion 201e play the same role as the ones in Embodiment 1.

Numeral 202 denotes a filter holding frame having a filter rotation shaft 110, a rotation pin 203, a pin 204, and a biasing pin 112.

The filter holding frame 202 (ND filter 109) which is in the withdrawn position is rotated around the filter rotation shaft 110 and inserted into the optical path by rotating the windmill member 201 beyond the open position (that is, when the cam pins 10 are in the position D) further in the opening direction and the insertion protrusion 201c pushes the rotation pin 203.

The filter holding frame 202 (ND filter 109) which is in the insertion position is rotated around the filter rotation shaft 110 and withdrawn from the optical path by rotating the windmill member 201 beyond the closed position (that is, when the cam pins 10 are in the position E) further in the closing direction and the withdrawn protrusion 201d pushes the rotation pin 203.

Moreover, as in Embodiment 1, when the aperture diameter is changed by rotating the diaphragm blades 104, the pin 204 abuts against the arc-shaped protrusion 201e, so that the filter holding frame 202 does not rotate. Thus, unnecessary movement of the ND filter 109 in the range in which the light quantity is adjusted by the diaphragm blades 104 can be suppressed.

Embodiment 4

FIGS. 14 to 17 illustrate the structure and operation of a light-quantity adjusting apparatus 300 according to Embodiment 4 of the present invention.

Figure 14:
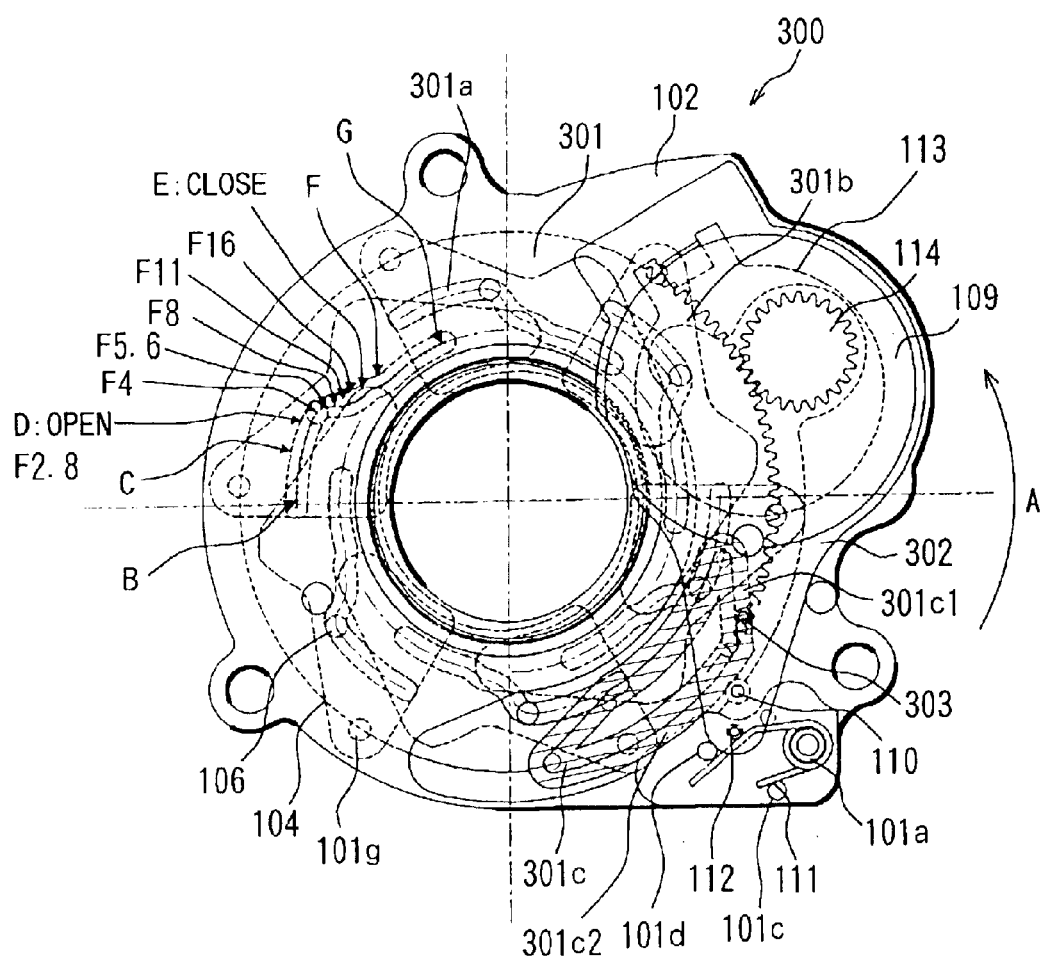
FIG. 14 is a diagram illustrating the situation when a light-quantity adjusting apparatus according to Embodiment 3 of the present invention is in the open position, and its ND filter is withdrawn.
Figure 15:
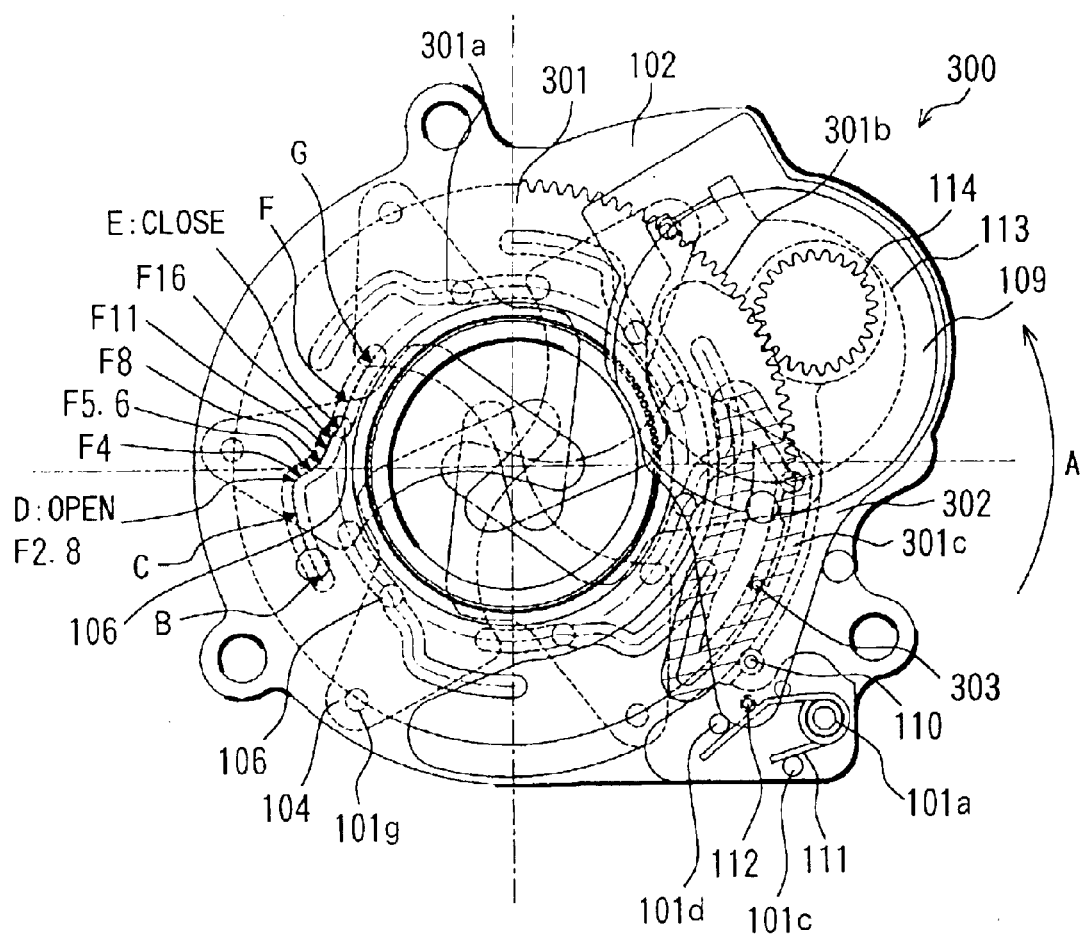
FIG. 15 is a diagram of the light-quantity adjusting apparatus in FIG. 14 illustrating the situation when the windmill member is rotated from the situation shown in FIG. 14, and the diaphragm blades are drawn together.
Figure 16:
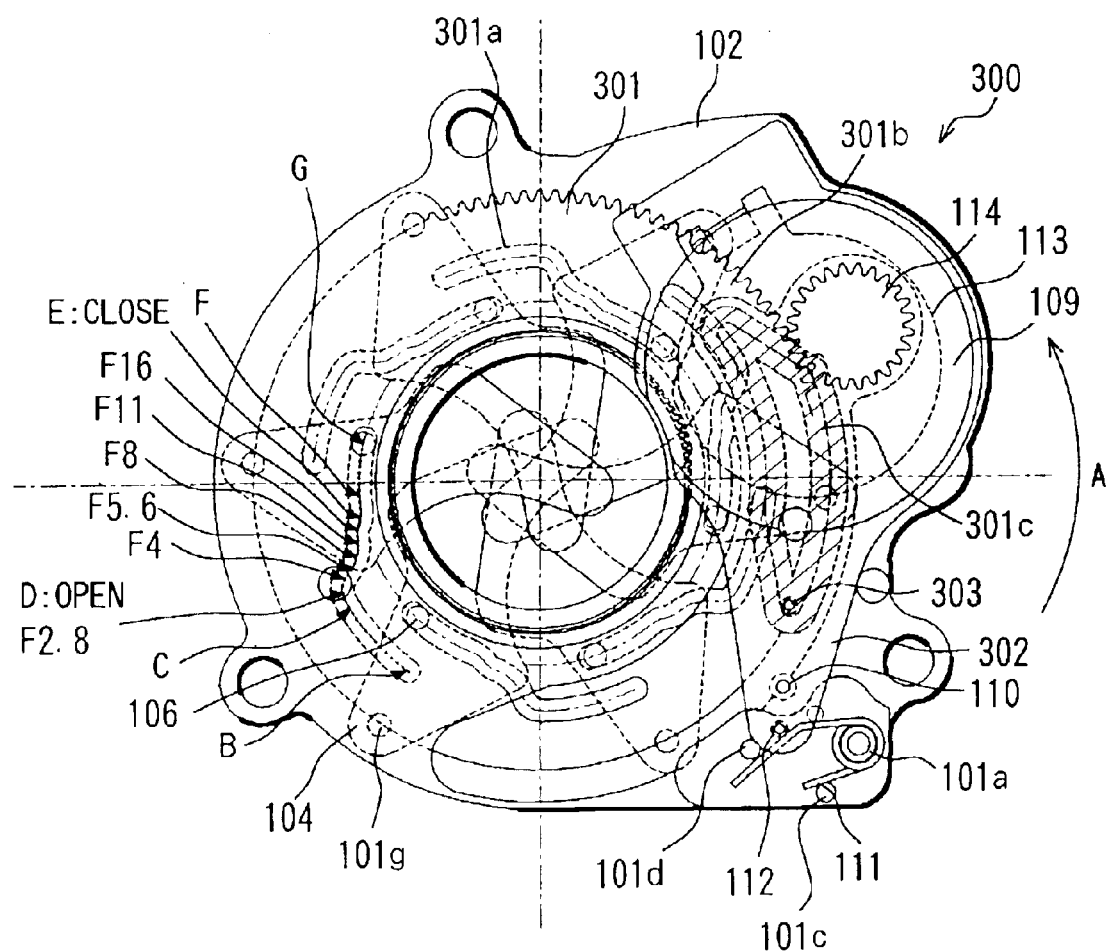
FIG. 16 is a diagram of the light-quantity adjusting apparatus in FIG. 14 illustrating the situation when the windmill member is further rotated from the situation shown in FIG. 15 to the mechanical limit.
Figure 17:
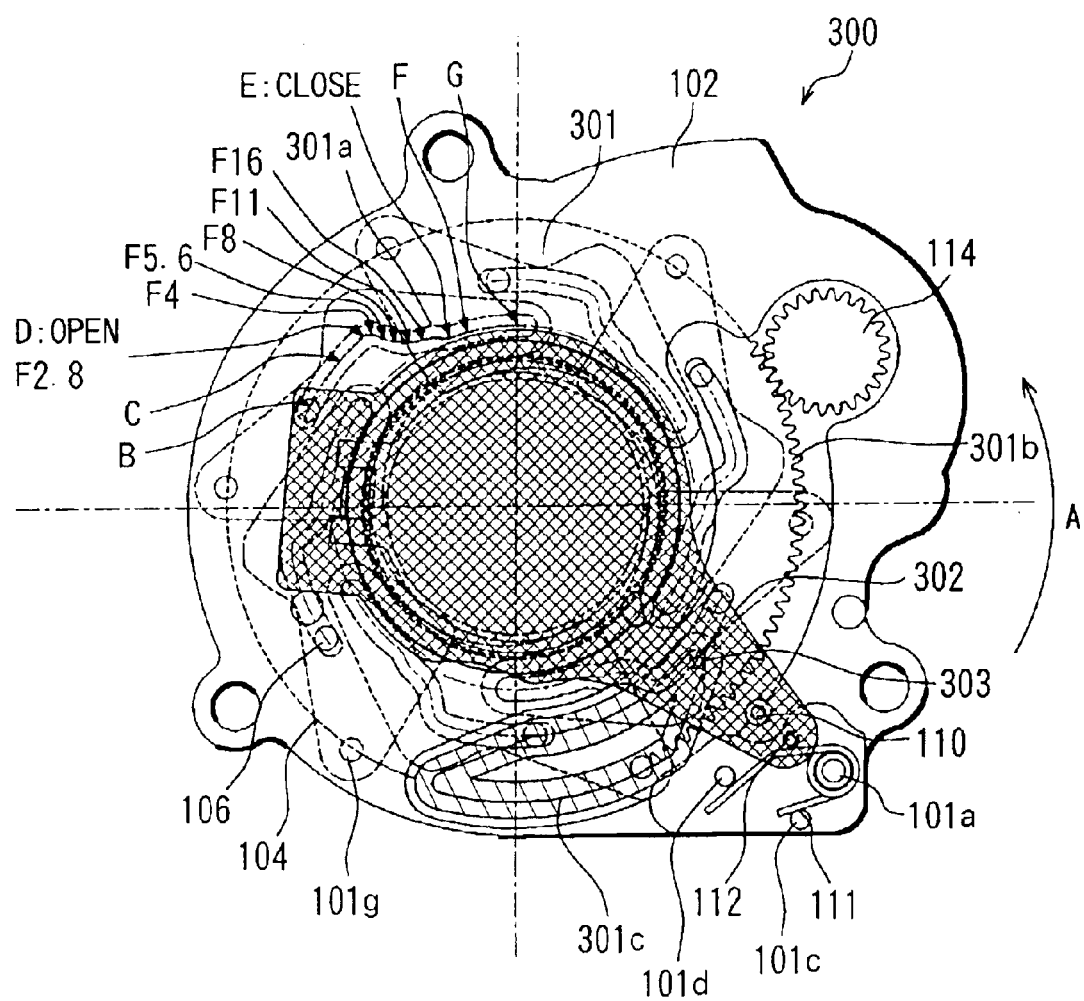
FIG. 17 is a diagram of the light-quantity adjusting apparatus in FIG. 14 illustrating the situation when the windmill member is rotated from the situation shown in FIG. 14, and the ND filter is inserted.

FIG. 14 is a diagram illustrating the situation when the diaphragm-shutter blades (in the following referred to simply as "diaphragm blades") are in the open position, and the ND filter is withdrawn from (moved out of) the optical path. FIG. 15 is a diagram illustrating the situation when the windmill member is rotated from the situation shown in FIG. 14, and the diaphragm blades are moved to the completely closed position. FIG. 16 is a diagram illustrating the situation when the windmill member is further rotated from the situation shown in FIG. 15 to the mechanical limit. FIG. 17 is a diagram illustrating the situation when the windmill member is rotated from the situation shown in FIG. 14, and the ND filter is inserted into the optical path.

It should be noted that in this embodiment, structural elements that are common to Embodiments 1 or 3 are given the same reference numerals as in those embodiments. The present embodiment differs from Embodiment 1 and 3 with regard to the fact that a filter cam 301c is formed on the windmill member 301, and this filter cam 301c drives the filter holding frame 302 to the insertion position and withdrawn position and prevents the filter holding frame 302 from moving to the insertion and withdrawn direction except the insertion and withdrawn driving times.

In FIGS. 14 to 17, numeral 301 denotes a windmill member that has cam grooves 301a and a gear portion 301b that are similar to the ones in Embodiment 1, and in which the filter cam 301c is formed.

As shown by the hatching in FIGS. 14 to 17, the filter cam 301c is a rail-shaped cam having a filter driving portion 301c1 that is tilted with respect to the circumferential direction of the windmill member 301, and an arc-shaped filter movement prevention portion 301c2 following the circumferential direction of the windmill member 301.

The filter holding frame 302 is provided with a filter rotation shaft 110, a rotation pin 303 and a biasing pin 112. The rotation pin 303 engages the filter cam 301c (that is, the filter driving portion 301c1 and the filter movement prevention portion 301c2). If the windmill member 301 is rotated from the open position (cam pins 106 are in position D) further in the opening direction, then the rotation pin 303 of the filter holding frame 302, which is in the withdrawn position, is pushed by the filter driving portion 301c1 of the filter cam 301c, and as a result the filter holding frame 302 is rotated around the filter rotation shaft 110, and the ND filter 109 is inserted into the optical path.

And if the windmill member 301 is rotated from the closed position (cam pins 106 are in position E) further in the closing direction, then the rotation pin 303 of the filter holding frame 302, which is in the insertion position, is pushed by the filter cam 301c, and as a result the filter holding frame 302 is rotated around the filter rotation shaft 110, and the ND filter 109 is withdrawn from the optical path.

Similar to Embodiment 1 and Embodiment 3, when the diaphragm blades 104 are rotated to change the diaphragm aperture diameter, the rotation pin 303 abuts against the filter movement prevention portion 301c2, which is the arc-shaped portion of the filter cam 301c, so that the filter holding frame 302 does not rotate. Thus, unnecessary movement of the ND filter 109 in the range in which the light quantity is adjusted by the diaphragm blades 104 can be suppressed.

It should be noted that the above-described embodiments have been described for the case that an ND filter is inserted or withdrawn with respect to the optical path, but the present invention can also be applied to cases in which optical filters other than ND filters are used.

Furthermore, it is also possible to use a motor other than a stepping motor as the actuator.

As explained above, with the present invention, it becomes possible to drive a light-blocking member and an optical filter with only one actuator, so that it becomes possible to make the light-quantity adjusting apparatus provided with the optical filter more compact and less expensive.

Herein, it is favorable for a drive mechanism to be structured so that the insertion or withdrawn of an optical filter with respect to an optical path may begin by operation of the actuator, having driven the light-blocking members to the open position, for a further predetermined amount in the opening direction. And, it is favorable for a drive mechanism to be structured so that the withdrawn or insertion of an optical filter with respect to an optical path may begin by operation of the actuator, having driven the light-blocking members to the closed position, for a further predetermined amount in the closing direction.

If the light-blocking member is driven at high speed, it may overshoot beyond the open position or the closed position when driving it open or closed, but by providing the above-described margin of a predetermined amount for the driving of the optical filter, a movement of the optical filter due to the overshooting of the light-blocking member can be suppressed.

Furthermore, when the light-blocking member is driven from the open position to the closed position, the actuator and the light-blocking member can change the aperture diameter after having been sufficiently accelerated by starting the operation of the actuator from an end position on the opening side in the above-mentioned region of a predetermined amount, so that the shutter speed can be made faster compared to the case that the start of the operation of the actuator coincides with the start of the change of the aperture diameter.

Furthermore, by providing the opening side and the closing side positions of the cams driving the light-blocking member next to one another at different positions in radial direction, the rotation angle of the rotating member (windmill member) can be increased, and the rotation angle of the rotating member for inserting and retracting the optical filter can be increased, so that the rotation force that is necessary for the insertion and the withdrawn of the optical filter can be decreased and the actuator can be made more compact.

Furthermore, by providing the rotating member with a filter movement prevention portion that prevents the movement of the optical filter in the insertion and the withdrawn direction when opening and closing the light-blocking member, unnecessary insertion and withdrawn of the optical filter due to vibrations or the like can be suppressed.

While preferred embodiments have been described, it is to be understood that modification and variation of the present invention may be made without departing from the scope of the following claims.

What is claimed is:

1. A light-quantity adjusting apparatus comprising:
    a light-blocking member that changes a quantity of light through an open/close operation within an optical path;
    an optical filter that can be moved into and out of the optical path, independently from the light-blocking member; and
    a driving mechanism that has a single actuator as a driving source and that drives the light-blocking member and the optical filter;
    wherein the driving mechanism drives the optical filter by at least one operation selected from operating the actuator further in an opening direction after the actuator has driven the light-blocking member into an open position, and operating the actuator further in a closing direction after the actuator has driven the light-blocking member into a closed position.

2. The light-quantity adjusting apparatus according to claim 1, wherein the driving mechanism moves the optical filter into or out of the optical path by operating the actuator further in the opening direction, after the actuator has driven the light-blocking member into the open position.

3. The light-quantity adjusting apparatus according to claim 1, wherein the driving mechanism moves the optical filter out of or into the optical path by operating the actuator further in the closing direction, after the actuator has driven the light-blocking member into the closed position.

4. The light-quantity adjusting apparatus according to claim 2, wherein the driving mechanism starts to move the optical filter into or out of the optical path by operating the actuator, which has driven the light-blocking member into the open position, a further predetermined amount in the opening direction.

5. The light-quantity adjusting apparatus according to claim 4, wherein the driving mechanism is configured such that the light-blocking member is not driven while the actuator operates in a region of the predetermined amount.

6. The light-quantity adjusting apparatus according to claim 5, wherein, when the light-blocking member is driven from the open position to the closed position, the actuator starts operating from an and position on the opening aide in the region of the predetermined amount.

7. The light-quantity adjusting apparatus according to claim 3, wherein the driving mechanism starts to move the optical filter into or out of the optical path by operating the actuator, which has driven the light-blocking member into the closed position, a further predetermined amount in the closing direction.

8. The light-quantity adjusting apparatus according to claim 7, wherein the driving mechanism is configured such that the light-blocking member is not driven while the actuator operates in a region of the predetermined amount.

9. The light-quantity adjusting apparatus according to claim 1, wherein, the driving mechanism includes a rotating member that is rotated by the actuator around the optical path; and
    the rotating member comprises a light-blocking member driving portion that opens and closes the light-blocking member, and a filter driving portion that moves the optical filter.

10. The light-quantity adjusting apparatus according to claim 9, wherein the rotating member has a filter movement prevention portion that prevents the shifting of the optical filter in the direction where the optical filter is moved into and out of the optical path when the light-blocking member is opened or closed.

11. The light-quantity adjusting apparatus according to claim 1, further comprising:
    a control unit that is electrically connected to the actuator and that controls the operation of the actuator; wherein the control unit makes an operation speed of the actuator when driving the optical filter slower than an operation speed of the actuator when driving the light-blocking member between the open position and the closed position.

12. An optical apparatus, comprising:
    a light-quantity adjusting apparatus according to claim 1; and
    an image-taking optical system including the light-quantity adjusting apparatus.

13. An optical apparatus, comprising:
    a light-quantity adjusting apparatus according to claim 1;
    an image-taking optical system including the light-quantity adjusting apparatus; and
    an image pickup apparatus that photoelectrically converts an object image formed with the image-taking optical system.

* * * * *

UNITED STATES PATENT AND TRADEMARK OFFICE
CERTIFICATE OF CORRECTION

PATENT NO. : 6,779,933 B2
DATED : August 24, 2004
INVENTOR(S) : Sato et al.

It is certified that error appears in the above-identified patent and that said Letters Patent is hereby corrected as shown below:

Column 3,
Line 62, please delete "100b" and insert therefore -- 101b --

Column 4,
Line 44, please delete "111a" and insert therefore -- 101a --

Signed and Sealed this

Seventeenth Day of May, 2005

JON W. DUDAS
*Director of the United States Patent and Trademark Office*